United States Patent
Peng et al.

(10) Patent No.: US 10,782,184 B2
(45) Date of Patent: Sep. 22, 2020

(54) OPTICAL DEVICE AND METHOD OF MANUFACTURING THE SAME

(71) Applicant: Advanced Semiconductor Engineering, Inc., Kaohsiung (TW)

(72) Inventors: Yu-Min Peng, Kaohsiung (TW); Ching-Han Huang, Kaohsiung (TW); Lu-Ming Lai, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 180 days.

(21) Appl. No.: 15/687,090

(22) Filed: Aug. 25, 2017

(65) Prior Publication Data
US 2018/0066982 A1   Mar. 8, 2018

Related U.S. Application Data

(60) Provisional application No. 62/384,039, filed on Sep. 6, 2016.

(51) Int. Cl.
*G01J 1/04* (2006.01)
(52) U.S. Cl.
CPC .......... *G01J 1/0407* (2013.01); *G01J 1/0422* (2013.01)
(58) Field of Classification Search
CPC . G01J 1/0422; G01J 1/0407; H01L 27/14625; H01L 27/14685
See application file for complete search history.

(56) References Cited

U.S. PATENT DOCUMENTS

| 5,930,433 A * | 7/1999 | Williamson | G02B 6/06 356/444 |
| 8,866,065 B2 | 10/2014 | Wober | |
| 2005/0274871 A1 * | 12/2005 | Li | H01L 27/14601 250/208.1 |
| 2009/0236151 A1 * | 9/2009 | Yeh | G06F 3/0412 178/18.03 |
| 2012/0001284 A1 * | 1/2012 | Tut | H01L 21/31116 257/432 |
| 2012/0003782 A1 * | 1/2012 | Byun | H01L 27/14625 438/72 |
| 2014/0078359 A1 * | 3/2014 | Lenchenkov | H01L 27/14627 348/294 |
| 2015/0137296 A1 * | 5/2015 | Chen | H01L 27/14621 257/432 |
| 2015/0171244 A1 | 6/2015 | Seo et al. | |
| 2016/0308015 A1 * | 10/2016 | Shea | H01L 23/485 |
| 2017/0017824 A1 | 1/2017 | Smith et al. | |
| 2017/0220840 A1 * | 8/2017 | Wickboldt | G06K 9/0053 |
| 2017/0286743 A1 * | 10/2017 | Lee | G02B 5/201 |

* cited by examiner

*Primary Examiner* — Thanh Luu
(74) *Attorney, Agent, or Firm* — Foley & Lardner LLP

(57) ABSTRACT

The present disclosure relates to an optical device. The optical device comprises an electronic component, a plurality of light conducting pillars and an opaque layer. The electronic component includes a plurality of pixels. Each of the light conducting pillars is disposed over a corresponding pixel of the plurality of pixels of the electronic component. The opaque layer covers a lateral surface of each of the light conducting pillars.

20 Claims, 22 Drawing Sheets

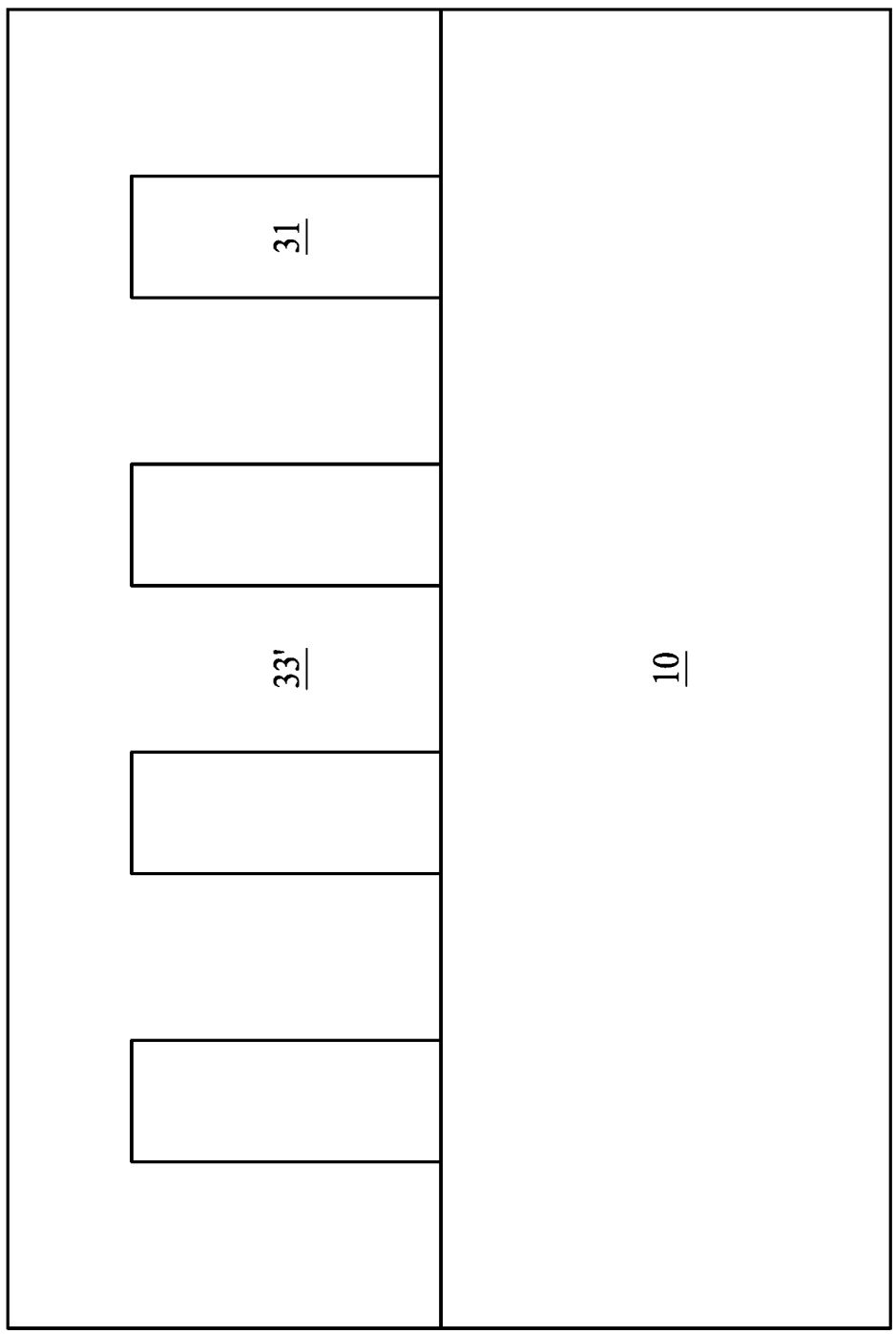

US 10,782,184 B2

OPTICAL DEVICE AND METHOD OF MANUFACTURING THE SAME

CROSS-REFERENCE TO RELATED APPLICATION

This application claims the benefit of and priority to U.S. Provisional Application No. 62/384,039, filed Sep. 6, 2016, the content of which is incorporated herein by reference in its entirety.

BACKGROUND

1. Technical Field

The present disclosure relates to an optical device and a method for manufacturing the same. More particularly, the present disclosure relates to an optical device including a collimator and a method for manufacturing the same.

2. Description of the Related Art

Some optical devices (e.g., finger print sensor) include a collimator. The collimator may have one or more apertures, each exposing corresponding pixel(s) of an image sensor such that substantially vertical light may pass through the apertures and reach the pixels of the image sensor. The arrangement of the collimator may improve an image recognition capability of the optical finger print sensor. A comparative collimator may be formed by penetrating a silicon substrate (e.g., wafer) to form a plurality of apertures by through-silicon via (TSV) technique, and bonding the substrate having the apertures on the image sensor. However, the TSV technique and the wafer bonding technique increase the cost for manufacturing the optical device. In addition, due to process limitations, it is difficult to form apertures with a high aspect ratio by using the TSV technique. In order to increase the aspect ratio of apertures, another comparative collimator may include multiple layers, each of which defines one or more apertures. However, it is difficult to align the apertures of each of the multiple layers.

SUMMARY

In accordance with an aspect of the present disclosure, an optical device comprises an electronic component, a plurality of light conducting pillars and an opaque layer. The electronic component has a plurality of pixels. Each of the light conducting pillars is disposed over a corresponding pixel of the plurality of pixels of the electronic component. The opaque layer covers a lateral surface of each of the light conducting pillars.

In accordance another aspect of the present disclosure, a method of manufacturing an optical device comprises providing an electronic component having a plurality of pixels; forming a plurality of light conducting pillars over the corresponding pixels of the electronic component; and forming an opaque layer to cover a lateral surface of each of light conducting pillars.

BRIEF DESCRIPTION OF THE DRAWINGS

FIG. 7C illustrates one or more stages of a method for manufacturing an optical device in accordance with some embodiments of the present disclosure.

Figure 1A:
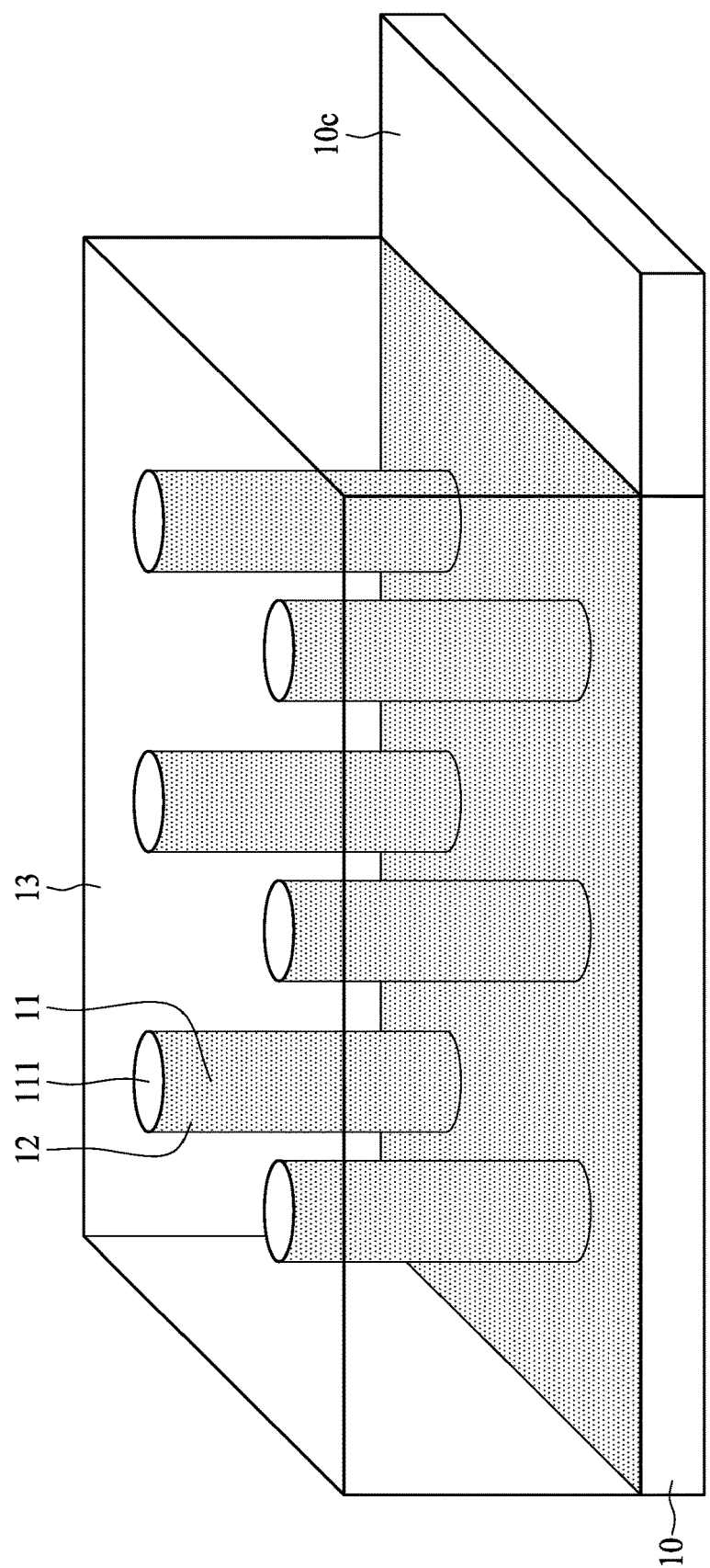
FIG. 1A illustrates a perspective view of some embodiments of an optical device in accordance with a first aspect of the present disclosure.

Common reference numerals are used throughout the drawings and the detailed description to indicate the same or similar components. The present disclosure can be best understood from the following detailed description taken in conjunction with the accompanying drawings.

DETAILED DESCRIPTION

FIG. 1A illustrates a perspective view of some embodiments of an optical device 1 in accordance with a first aspect of the present disclosure. The optical device 1 includes an electronic component 10, multiple light conducting pillars 11, an opaque layer 12 and a protective layer 13.

Figure 1B:
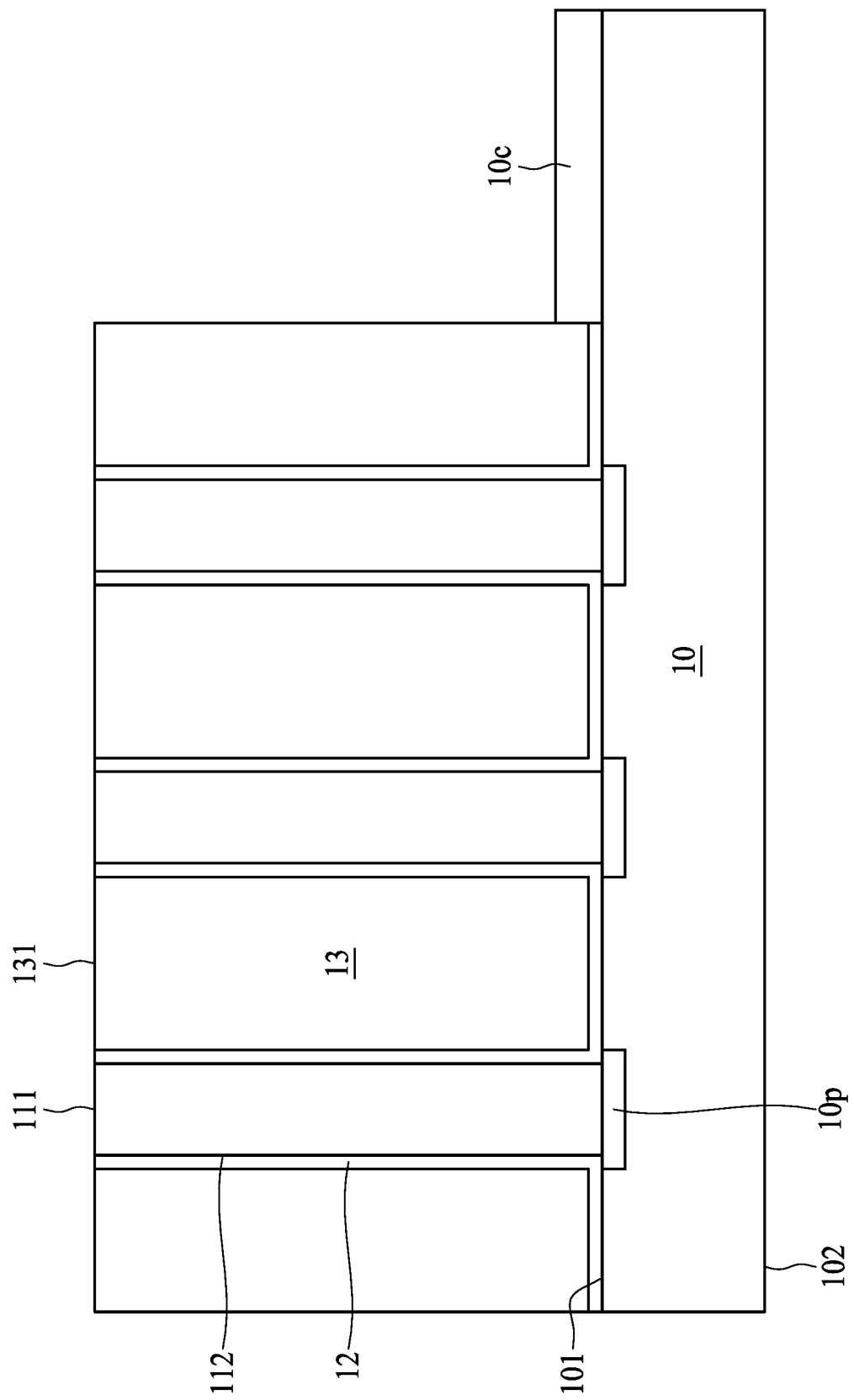
FIG. 1B illustrates a cross-sectional view of some embodiments of an optical device in accordance with a first aspect of the present disclosure.

As shown in FIG. 1B, which illustrates a cross-sectional view of the optical device 1 of FIG. 1A, the electronic component 10 has an active surface 101 (also referred to as top surface or light receiving surface) and a back surface 102 (also referred to as bottom surface) opposite to the active surface 101. In some embodiments, the electronic component 10 is an image sensor, such as a light detector which is, for example, a PIN diode (e.g., a diode including a p-type semiconductor region, an intrinsic semiconductor region, and an n-type semiconductor region), a photo-diode, or a photo-transistor. The electronic component 10 has a plurality of pixels 10p (e.g., light sensing pixels or imaging pixels) on its active surface 101. In some embodiments, the electronic component 10 includes a bonding area 10c (e.g., bonding pads) to provide electrical connections between the electronic component 10 and other devices or circuits.

The light conducting pillars 11 are disposed on the active surface 101 of the electronic component 10 and substantially perpendicular to the active surface 101 of the electronic component 10. As shown in FIG. 1B, each of the light conducting pillars 11 is disposed on a corresponding pixel on the active surface 101 of the electronic component 10. Each of the light conducting pillars 11 allows the light with a desired wavelength (or a desired range of wavelengths) passing through. In some embodiments, the light conducting pillars 11 include, e.g., photosensitive transparent resin. In some embodiments, an aspect ratio of the light conducting pillars 11 may be greater than about 5:1, greater than about 10:1, or greater than about 20:1. In some embodiments, the width of the light conducting pillars 11 may be, e.g., less than about 10 micrometer (μm), less than about 5 μm, or less than about 2 μm. In some embodiments, the height of the light conducting pillars 11 may be, e.g., greater than about 100 μm, greater than about 150 μm, or greater than about 200 μm.

An opaque layer 12 is disposed on a sidewall 112 (also referred to as lateral surface) of each of the light conducting pillars 11 to cover the sidewall 112 of each of the light conducting pillars 11 and to expose a top surface 111 of each of the light conducting pillars 11. In some embodiments, the opaque layer 12 may include a light absorbing layer, ink, photoresist, or a combination of two or more thereof. In some embodiments, a portion of the opaque layer 12 may be disposed on at least a portion of the active surface 101 of the electronic component 10 and may expose the bonding area 10c and the pixels 10p of the electronic component 10. In some embodiments, the light conducting pillars 11 covered by the opaque layer 12 may act as a collimator, in which the light (e.g., in a direction in which the light is not reflected by the target) reaching the sidewall 112 of the light conducting pillars 11 is absorbed by the opaque layer 12. Thus, the cross talk is reduced, and the light propagating substantially in a desired direction (e.g., in a direction in which the light reflected by the target is transmitted substantially parallel to lengthwise axes of the conducting pillars 11) is selectively allowed to pass through the light conducting pillars 11. Such an arrangement improves the optical performance (e.g., image recognition) of the electronic component 10.

In comparison with the comparative collimator (which is formed by TSV technique, wafer bonding technique, or a combination thereof), the light conducting pillars 11 formed on the corresponding pixels of the electronic component 10 as shown in FIGS. 1A and 1B may reduce the manufacturing cost. A comparative collimator made of silicon with higher reflective index on visible light will induce noise during light transmission; on the other hand, the light conducting pillars 11 covered by the opaque layer 12 can reduce noise and enhance the optical performance of the optical device 1. Furthermore, since the light conducting pillars 11 may be integrally formed, the non-alignment issue for the collimator having multiple layers can be eliminated.

The protective layer 13 is disposed on the active surface 101 of the electronic component 10. The protective layer 13 covers the opaque layer 12 and a portion of the active surface 101 of the electronic component 10 and exposes the top surface 111 of the light conducting pillars 11 and the bonding area 10c of the electronic component 10. For example, a top surface 131 of the protective layer 13 is substantially coplanar with the top surface 111 of the light conducting pillars 11. In some embodiments, the protective layer 13 may include, for example, organic materials (e.g., molding compound, bismaleimide triazine (BT), polyimide (PI), polybenzoxazole (PBO), solder resist, Ajinomoto build-up film (ABF), polypropylene (PP), epoxy-based material, or a combination of two or more thereof), inorganic materials (e.g., silicon, glass, ceramic or quartz), photoresist, dry-film materials, or a combination of two or more thereof. In some embodiments, the protective layer 13 may be transparent or opaque depending on design specifications of various embodiments.

Figure 2A:
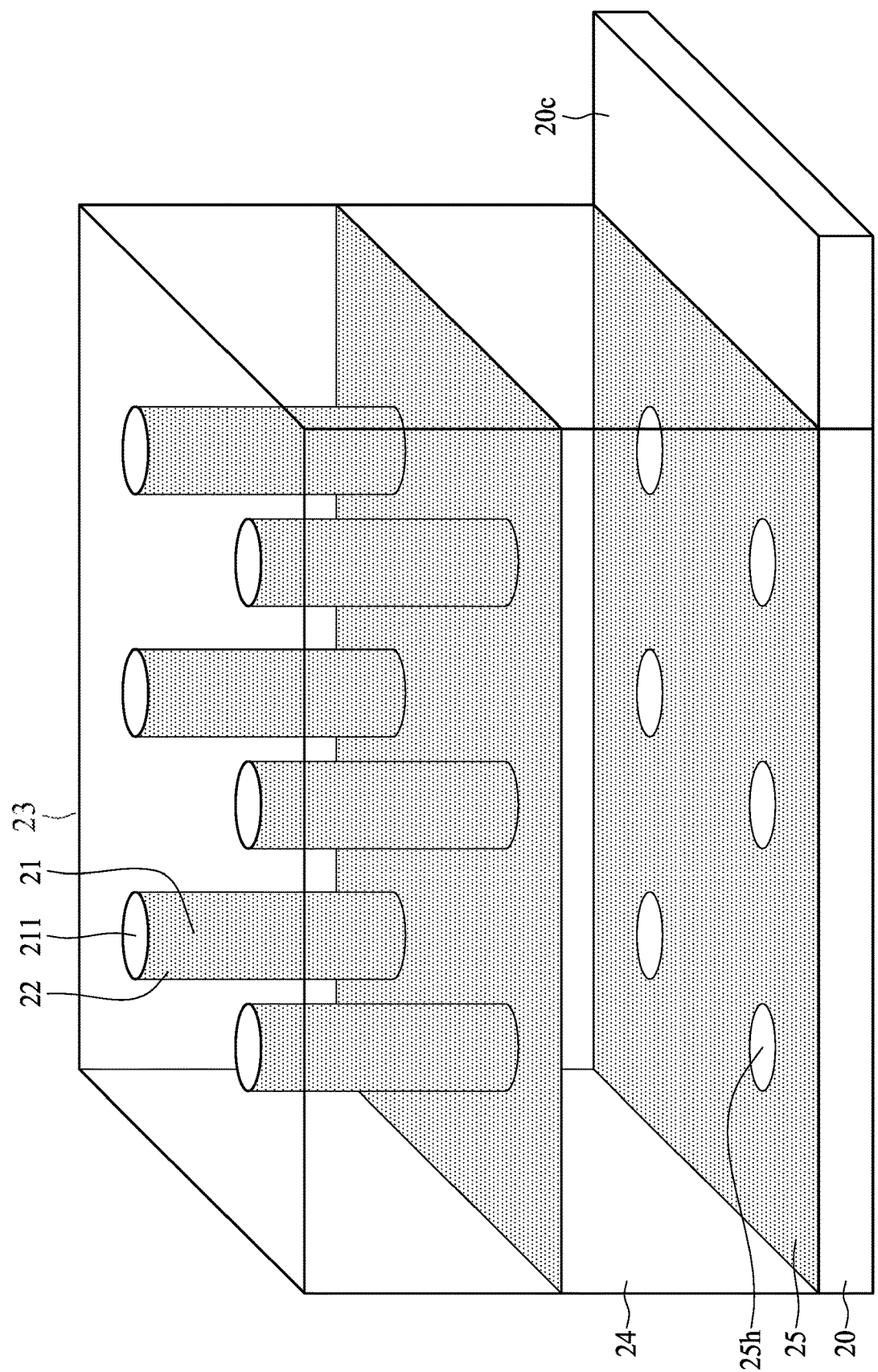
FIG. 2A illustrates a perspective view of some embodiments of an optical device in accordance with a second aspect of the present disclosure.

In some embodiments, an optical device as disclosed may include a light transmission layer and a light shielding layer below the light conductive pillars. The light transmission layer may help relaxing a specification of the aspect ratio of the light conductive pillars. FIG. 2A illustrates a perspective view of some embodiments of an optical device 2 in accordance with a second aspect of the present disclosure. The optical device 2 includes an electronic component 20, multiple light conducting pillars 21, an opaque layer 22, a protective layer 23, a light transmission layer 24 and a light shielding layer 25.

Figure 2B:
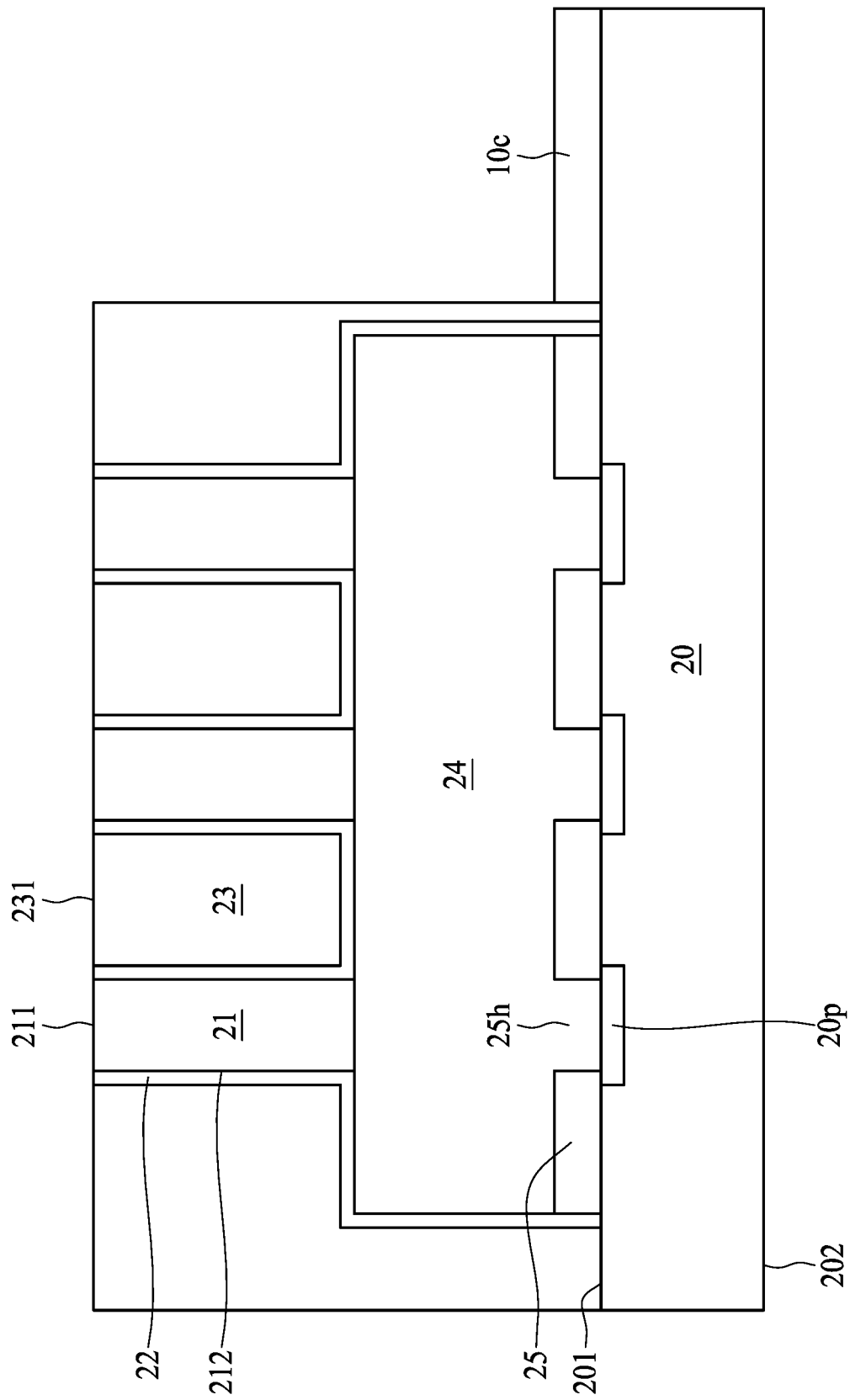
FIG. 2B illustrates a cross-sectional view of some embodiments of an optical device in accordance with a second aspect of the present disclosure.

As shown in FIG. 2B, which illustrates a cross-sectional view of the optical device 2 of FIG. 2A, the electronic component 20 has an active surface 201 (also referred to as top surface or light receiving surface) and a back surface 202 (also referred to as bottom surface) opposite to the active surface 201. In some embodiments, the electronic component 20 is an image sensor, such as a light detector which is, for example, a PIN diode (e.g., a diode including a p-type semiconductor region, an intrinsic semiconductor region, and an n-type semiconductor region), a photo-diode, or a photo-transistor. The electronic component 20 has a plurality of pixels 20p on its active surface 201. In some embodiments, the electronic component 20 includes a bonding area 20c (e.g., bonding pads) to provide electrical connections between the electronic component 20 and other devices or circuits.

The light shielding layer 25 is disposed on the active surface 201 of the electronic component 20. The light shielding layer 25 defines a plurality of openings 25h (also referred to as apertures) to expose the pixels 20p of the electronic component 20. In some embodiments, the light shielding layer 25 may include a light absorbing layer, ink, photoresist, or a combination of two or more thereof.

The light transmission layer 24 is disposed on the active surface 201 of the electronic component 20 to cover the light shielding layer 25 and to expose the bonding area 20c. The light transmission layer 24 allows the light to pass through and reach the pixels 20p of the electronic component 20 that are exposed from the light shielding layer 25.

The light conducting pillars 21 are disposed on the light transmission layer 24 and substantially perpendicular to the light transmission layer 24. As shown in FIG. 2B, each of the light conducting pillars 21 is substantially aligned with a corresponding pixel of the electronic component 20 that is exposed from the light shielding layer 25. The light conducting pillars 21 allow the light with a desired wavelength (or a desired range of wavelengths) passing through. In some embodiments, the light conducting pillars 21 include, e.g., photosensitive transparent resin. In some embodiments, the light conducting pillars 21 and the light transmission layer 24 may be formed of, or include, different materials. Alternatively, the light conducting pillars 21 and the light transmission layer 24 may be formed of, or include, the same material. In some embodiments, an aspect ratio of the light conducting pillars 21 is less than about 5:1, less than about 3:1, or less than about 2:1.

The opaque layer 22 covers the sidewall 212 (also referred to as lateral surface) of each of the light conducting pillars 21 and the light transmission layer 24. The opaque layer 22 exposes a top surface 211 of each of the light conducting pillars 21. In some embodiments, the opaque layer 22 may include a light absorbing layer, ink, photoresist, or a combination of two or more thereof. In some embodiments, the light transmission layer 24 and the light conducting pillars 21 covered by the opaque layer 22 may act as a collimator, in which the light reaching the sidewall 212 of the light conducting pillars 21 is absorbed by the opaque layer 22 and the light propagating substantially in a desired direction (e.g., a direction in which the light is transmitted substantially parallel to the conducting pillars 11) is selectively allowed to pass through the light conducting pillars 21. Such an arrangement improves the optical performance of the electronic component 20.

In comparison with the optical device 1 shown in FIGS. 1A and 1B, by disposing the light transmission layer 24 between the light conducting pillars 21 and the electronic component 20, the height (and the aspect ratio) of the light conducting pillars 21 can be reduced. For example, the light conducting pillars 11 shown in FIGS. 1A and 1B might be greater than about 100 µm, greater than about 150 µm, or greater than about 200 µm in order to achieve a desired performance. As shown in FIGS. 2A and 2B, a similar performance can be achieved by using the light transmission layer 24 with a thickness of from about 80 µm to about 100 µm, from about 50 µm to about 150 µm, or from about 20 µm to about 200 µm and the light conducting pillars 21 with a height of from about 55 µm to about 70 µm, from about 30 µm to about 80 µm, or from about 10 µm to about 100 µm. Reducing the height of the light conducting pillars may reduce the manufacturing cost.

The protective layer 23 is disposed on the light transmission layer 24. In some embodiments, the protective layer 23 may also be disposed on the active surface 201 of the electronic component 20. The protective layer 23 covers the opaque layer 22 and a portion of the active surface 201 of the electronic component 20. The protective layer 23 exposes the top surface 211 of the light conducting pillars 21 and the bonding area 20c of the electronic component 20. For example, a top surface 231 of the protective layer 23 is substantially coplanar with the top surface 211 of the light conducting pillars 21. In some embodiments, the protective layer 23 may include, for example, organic materials (e.g., molding compound, BT, PI, PBO, solder resist, ABF, PP or epoxy-based material), inorganic materials (e.g., silicon, glass, ceramic or quartz), photoresist, dry-film materials, or a combination of two or more thereof. In some embodiments, the protective layer 23 may be transparent or opaque depending on design specifications of various embodiments.

Figure 3:
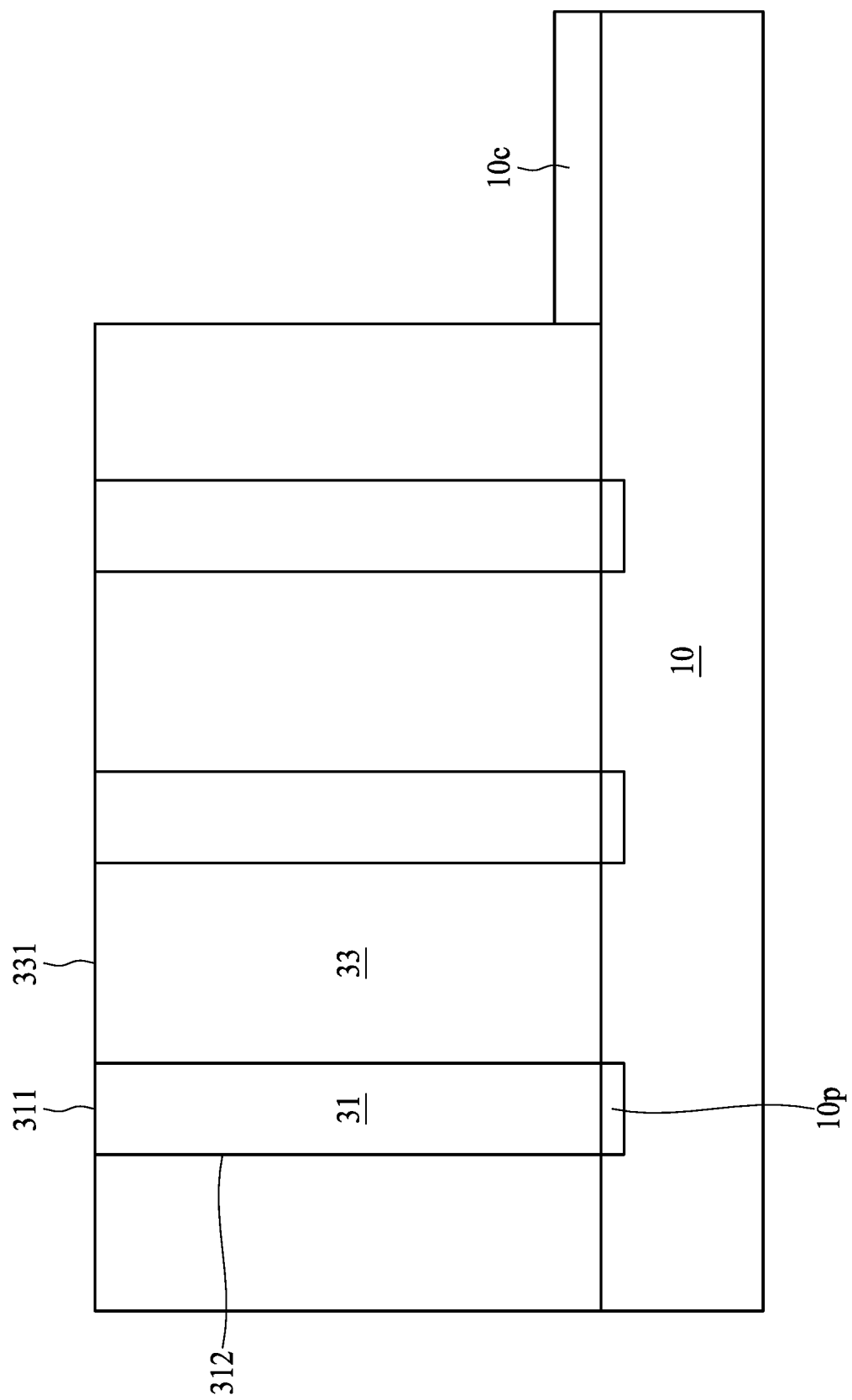
FIG. 3 illustrates a cross-sectional view of some embodiments of an optical device in accordance with a third aspect of the present disclosure.

FIG. 3 illustrates a cross-sectional view of some embodiments of an optical device 3 in accordance with a third aspect of the present disclosure. The optical device 3 is similar to the optical device 1 shown in FIGS. 1A and 1B, except that the optical device 3 is specified for infrared (IR) application.

In some embodiments, the light transmitting pillars 31 of the optical device 3 are formed of silicon to allow IR light passing through. The protective layer 33 of the optical device 3 may be formed of organic material (e.g., molding compound). The protective layer 33 covers the lateral surface 312 of the light transmitting pillars 31 and exposes the top surface 311 of the light transmitting pillars 31. In some embodiments, the opaque layer may be omitted.

Figure 4A:
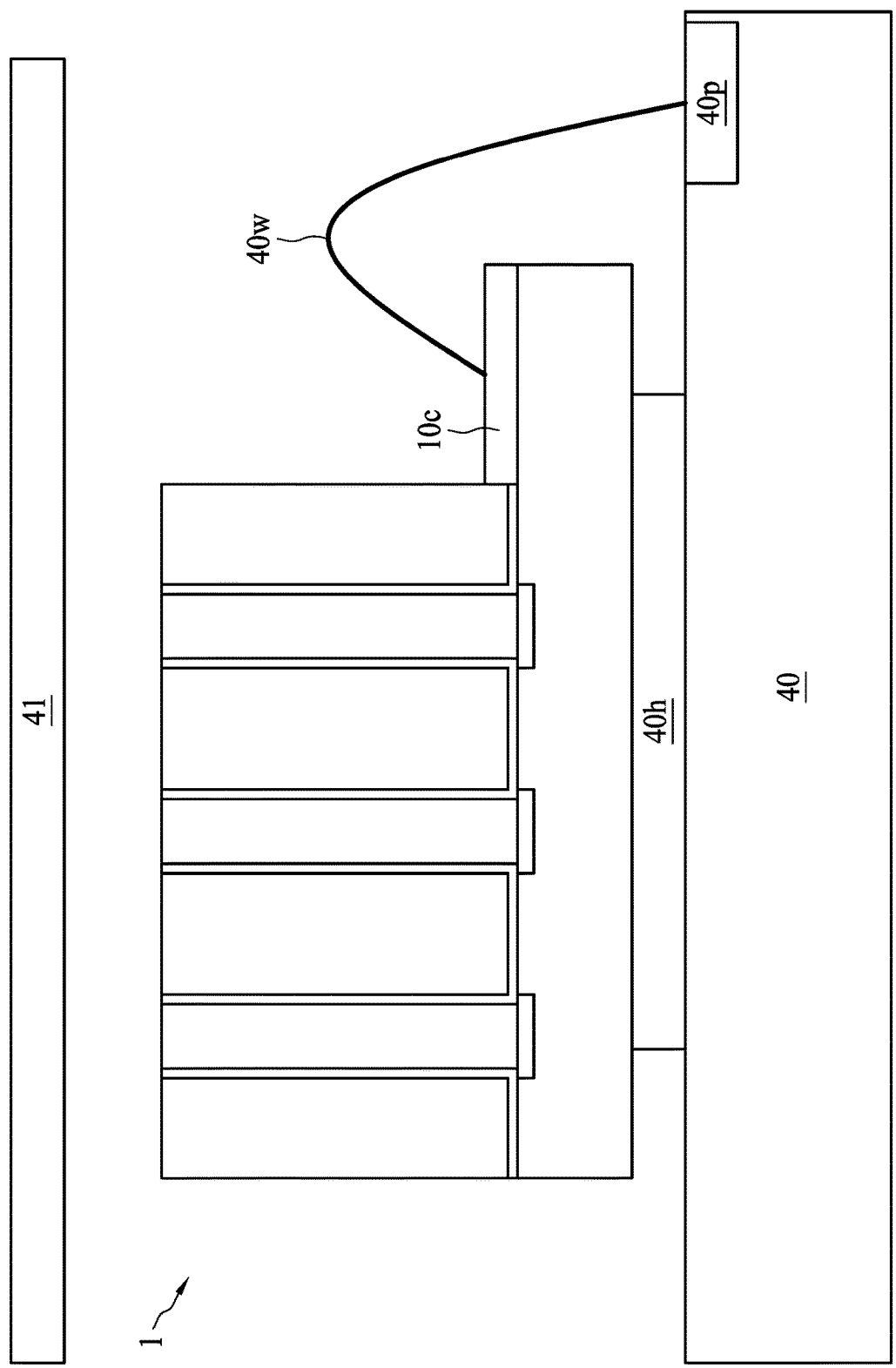
FIG. 4A illustrates a cross-sectional view of some embodiments of an optical module in accordance with a fourth aspect of the present disclosure.

FIG. 4A illustrates a cross-sectional view of some embodiments of an optical module 4A in accordance with a fourth aspect of the present disclosure. The optical module 4A includes the optical device 1 as shown in FIG. 1B, a carrier 40 and a lens 41. In some embodiments, the optical module 4A may be a component to be integrated into an electronic device (e.g., a cell phone, a tablet, a notebook, a personal digital assistant and the like), and the lens 41 may be the glass of the electronic device to allow the light passing through.

The carrier 40 may include, for example, a printed circuit board, such as a paper-based copper foil laminate, a composite copper foil laminate, a polymer-impregnated glass-fiber-based copper foil laminate, or a combination of two or more thereof. The carrier 40 may include an interconnection structure, such as a plurality of conductive traces or a through via. In some embodiments, the carrier 40 includes a ceramic material or a metal plate. In some embodiments, the carrier 40 may include a substrate, such as an organic substrate or a leadframe. In some embodiments, the carrier 40 may include a two-layer substrate which includes a core layer and a conductive material and/or structure disposed on an upper surface and a bottom surface of the carrier 40. The conductive material and/or structure may include a plurality of traces.

The optical device 1 is disposed on the carrier 40 and may be attached to the carrier 40 through an adhesive 40h (e.g., glue or tape). In some embodiments, one or more conductive pads at the bonding area 10c of the optical device 1 are electrically connected to one or more conductive pads 40p of the carrier 40 by one or more conductive wires 40w. For example, one end of each conductive wire 40w is bonded to the conductive pad of the optical device 1 and another end of the conductive wire 40w is bonded to a corresponding conductive pad of the carrier 40.

Figure 4B:
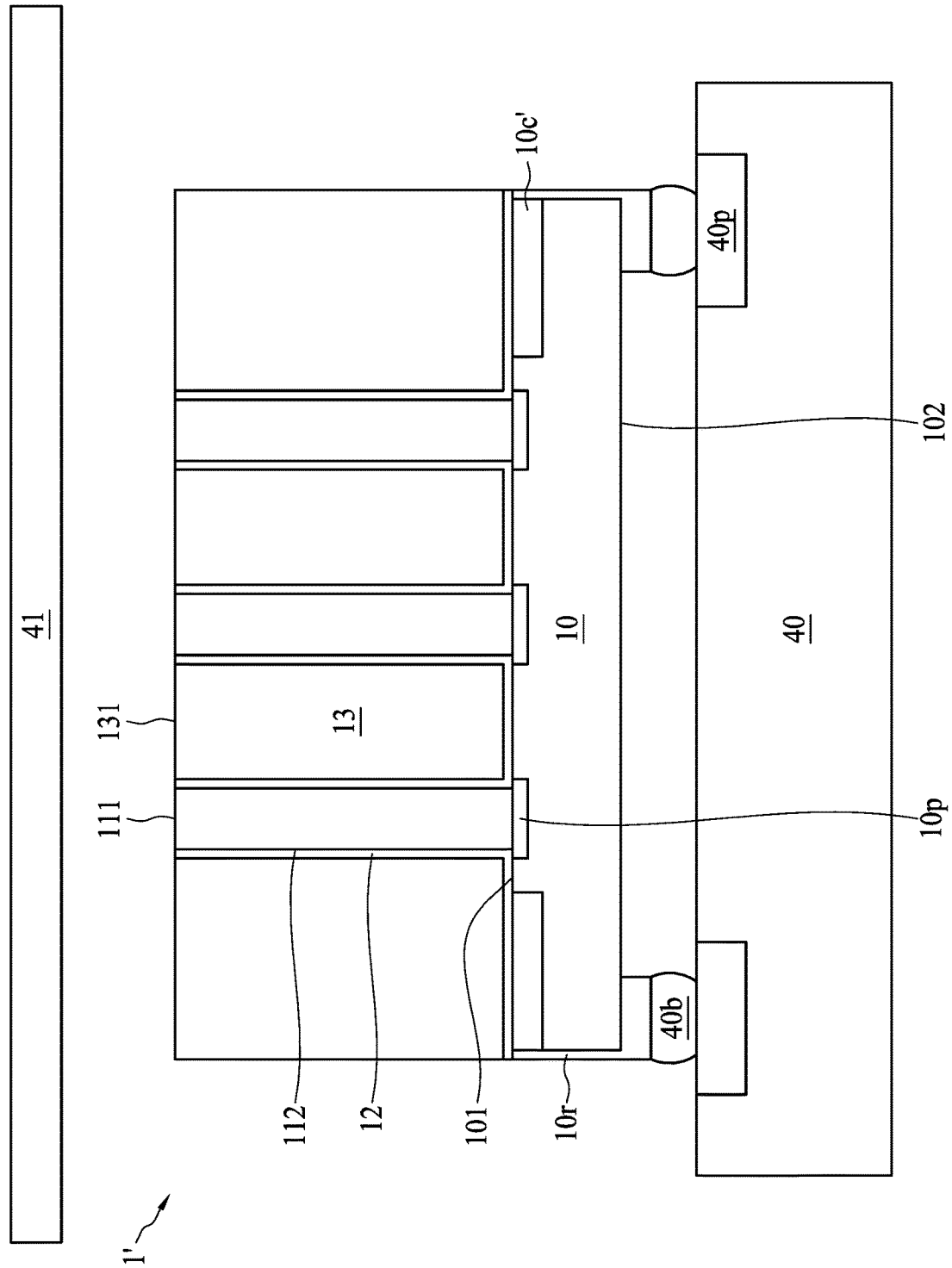
FIG. 4B illustrates a cross-sectional view of some embodiments of an optical module in accordance with a fifth aspect of the present disclosure.

FIG. 4B illustrates a cross-sectional view of some embodiments of an optical module 4B in accordance with a fifth aspect of the present disclosure. The optical module 4B is similar to the optical module 4A shown in FIG. 4A except that in FIG. 4B, the optical device 1' is electrically connected to the carrier 40 using flip-chip technique.

The conductive pads 10c' on the active surface 101 of the electronic component 10 are electrically connected to the back surface 102 of the electronic component 10 through redistribution layer (RDL) 10r disposed within the electronic component 10. The optical device 1' is electrically connected to one or more conductive pads 40p of the carrier 40 through one or more conductive contacts 40b (e.g., solder balls).

Figure 4C:
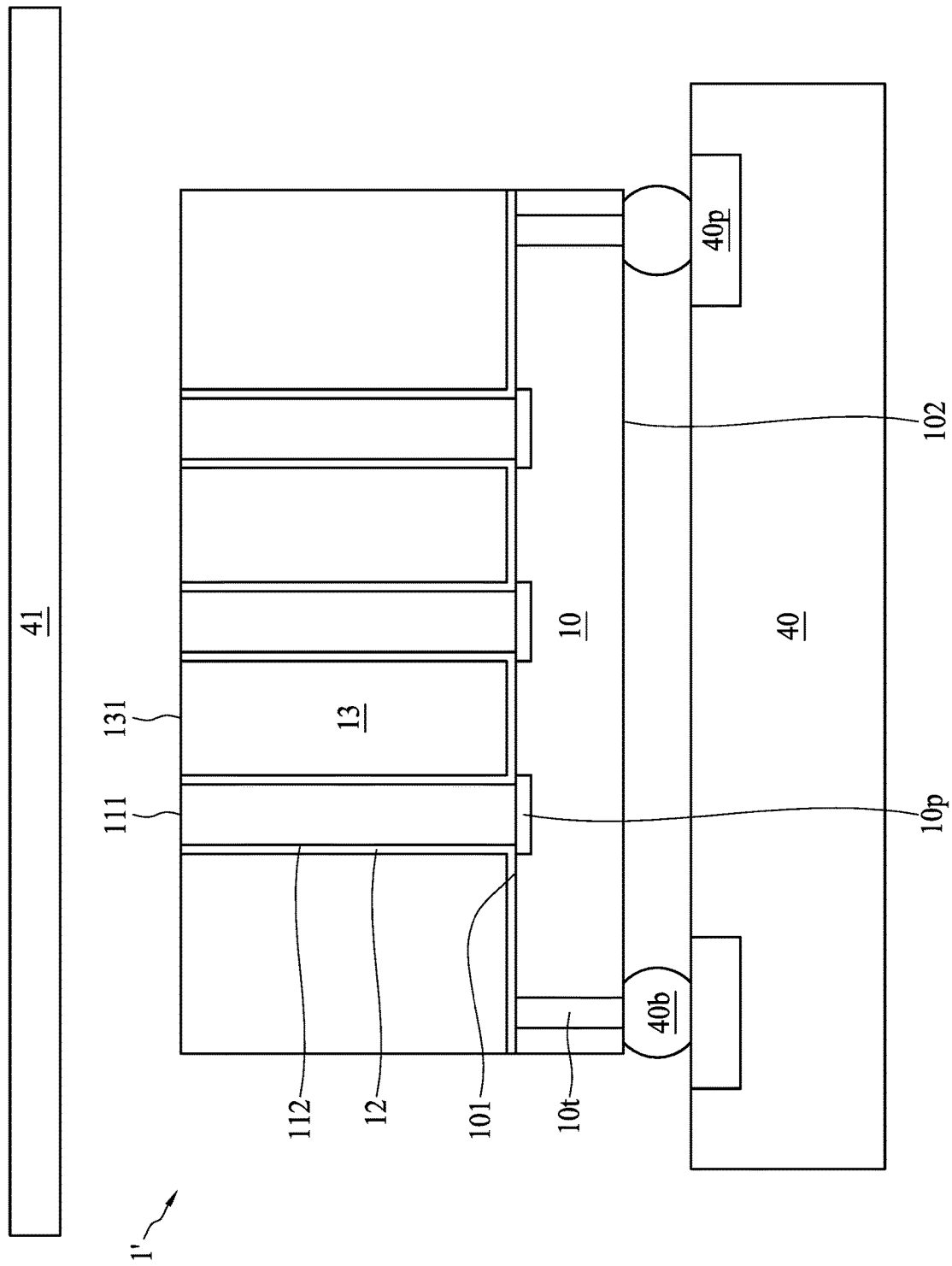
FIG. 4C illustrates a cross-sectional view of some embodiments of an optical module in accordance with a sixth aspect of the present disclosure.

FIG. 4C illustrates a cross-sectional view of some embodiments of an optical module 4C in accordance with a sixth aspect of the present disclosure. The optical module 4C is similar to the optical module 4B shown in FIG. 4B except that in FIG. 4C, the active surface 101 of electronic component 10 is electrically connected to the back surface 102 of the electronic component 10 using TSV technique.

The electronic component 10 includes one or more TSVs 10t extending through the electronic component 10. The TSV 10t is electronically connected to one or more conductive pads 40p of the carrier 40 through one or more conductive contacts 40b (e.g., solder balls).

FIG. 5A, FIG. 5B, FIG. 5C and FIG. 5D illustrate various stages of a method for manufacturing an optical device 1 as shown in FIG. 1A in accordance with some embodiments of the present disclosure. Although some processes, operations or steps are described in the following with respect to each of a plurality of components, any of those processes, operations or steps may be selectively performed with respect to one of the plurality of components, or with respect to some number in between one and the full plurality of components.

Figure 5A:
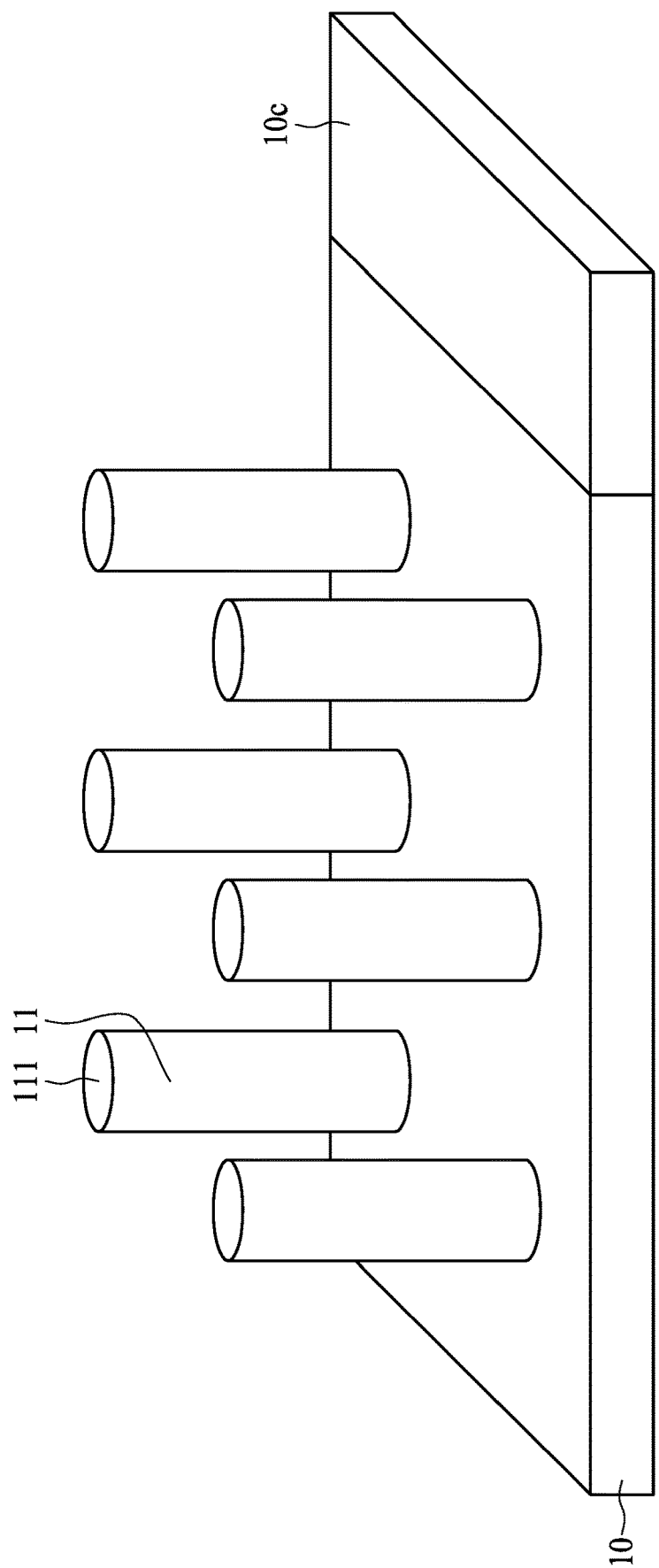
FIG. 5A illustrates one or more stages of a method for manufacturing an optical device in accordance with some embodiments of the present disclosure.

Referring to FIG. 5A, an electronic component 10 is provided. The electronic component 10 may include a bonding area 10c. Light conducting pillars 11 are formed on an active surface 101 of the electronic component 10 and substantially perpendicular to the active surface 101 of the electronic component 10. Each of the light conducting pillars 11 is formed on a corresponding pixel on the active surface 101 of the electronic component 10. In some embodiments, the light conducting pillars 11 are formed by, e.g., lithographic technique.

Figure 5B:
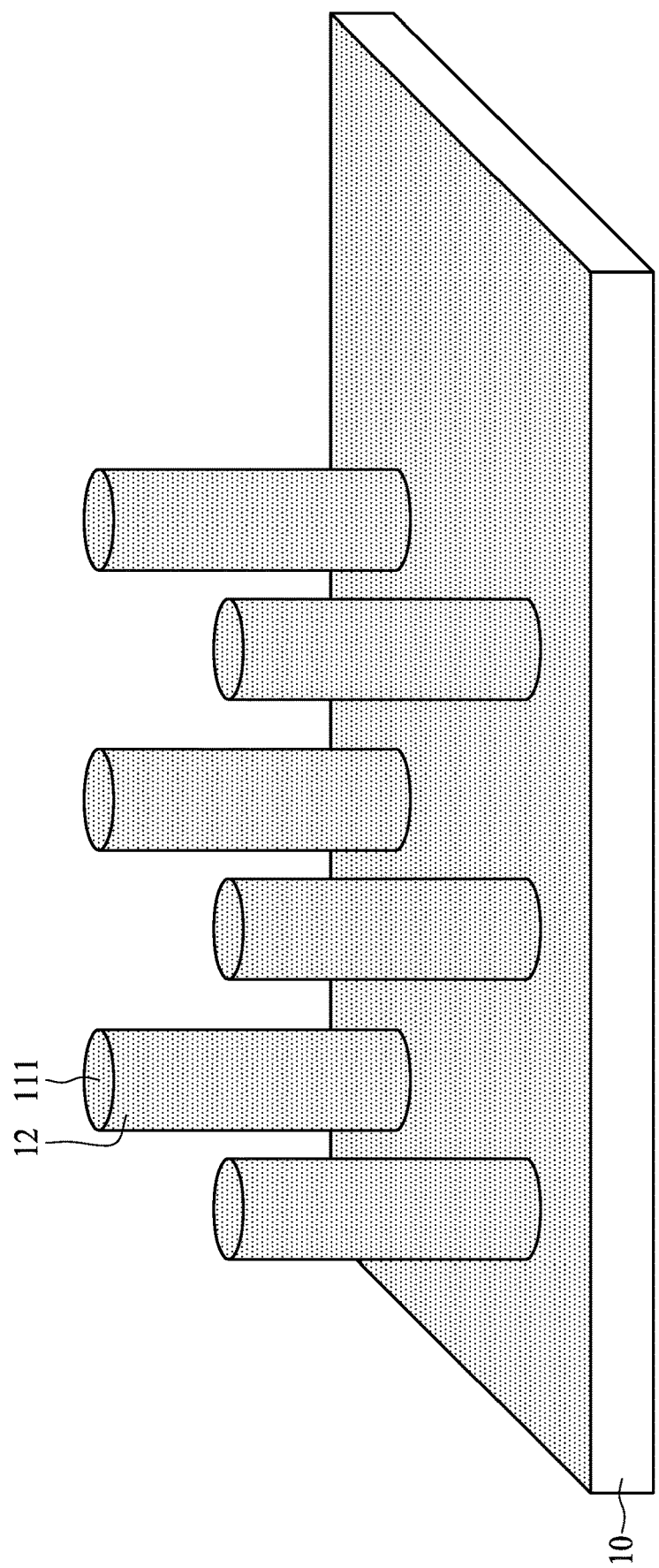
FIG. 5B illustrates one or more stages of a method for manufacturing an optical device in accordance with some embodiments of the present disclosure.

Referring to FIG. 5B, an opaque layer 12 is formed to cover the light conducting pillars 11 and the electronic component 10. In some embodiments, the opaque layer 12 can be formed by, sputtering, surface coating, chemical vapor deposition (CVD) or other suitable processes.

Figure 5C:
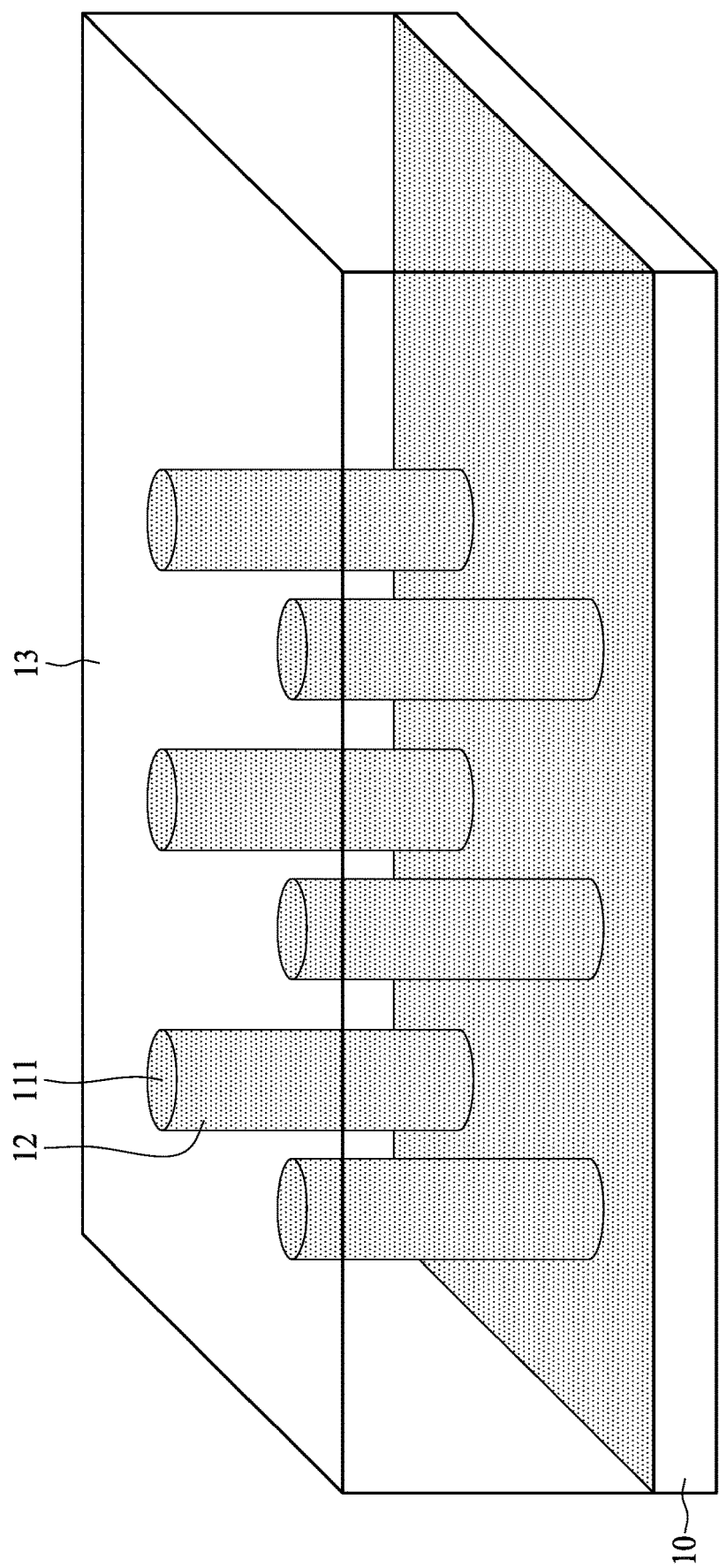
FIG. 5C illustrates one or more stages of a method for manufacturing an optical device in accordance with some embodiments of the present disclosure.

Referring to FIG. 5C, a protective layer 13 is formed to cover the light conducting pillars 11 and the active surface 101 of the electronic component 10. In some embodiments, the protective layer 13 can be formed by, e.g., a molding technique, such as transfer molding or compression molding.

Figure 5D:
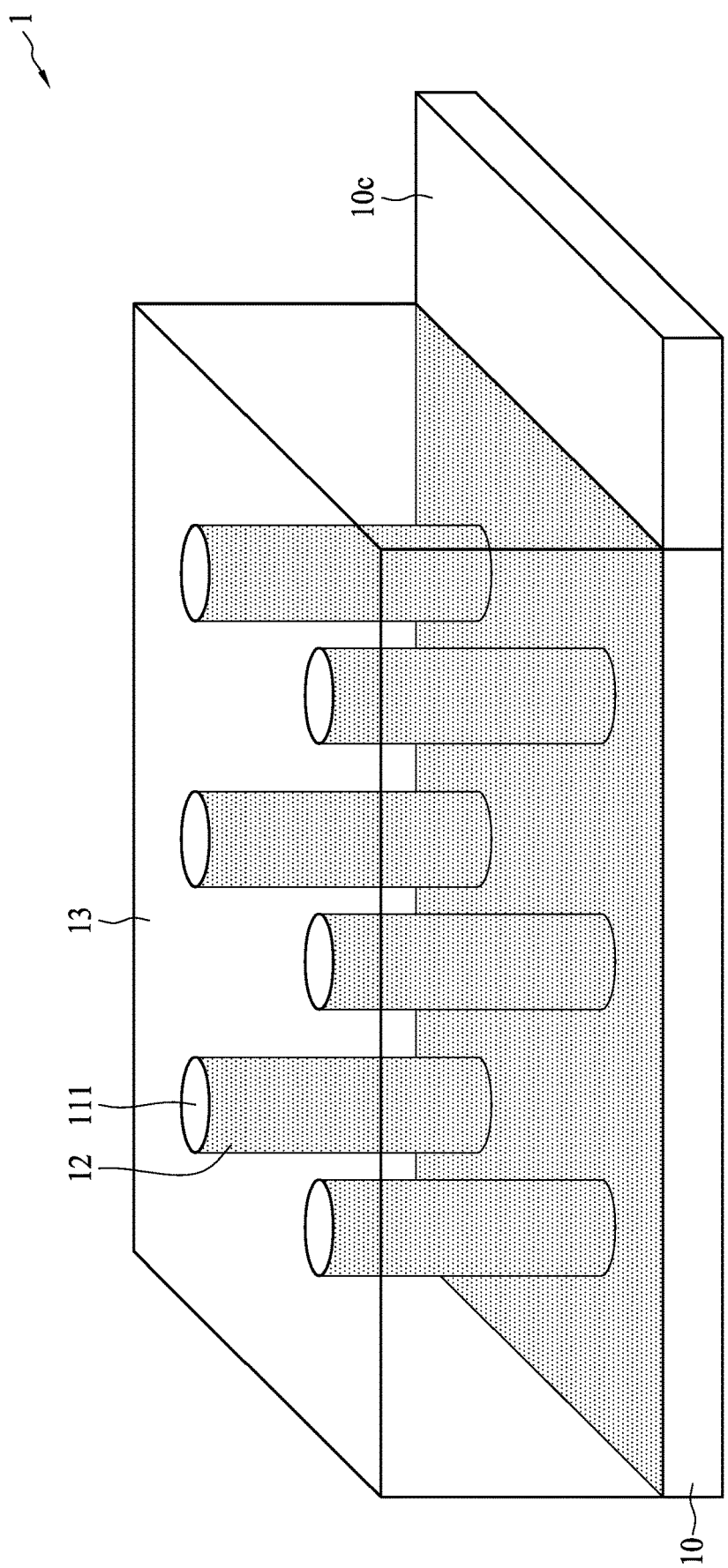
FIG. 5D illustrates one or more stages of a method for manufacturing an optical device in accordance with some embodiments of the present disclosure.

Referring to FIG. 5D, a portion of the protective layer 13 and a portion of the opaque layer 12 are removed to expose the top surface 111 of the light conducting pillars 11 and the bonding area 10c of the electronic component 10. In some embodiments, the portion of the opaque layer 12 can be removed by, for example, etching or other suitable processes. In some embodiments, in the case that the protective layer 13 is a photoresist, the portion of the protective layer 13 can be removed by, for example, lithographic technique. In some embodiments, in the case that the protective layer 13 is a molding compound, the portion of the protective layer 13 can be removed by cutting a portion of the protective layer 13 over the bonding area 10c of the electronic component 10 and then removing the remaining portion of the protective layer 13 over the bonding area 10c of the electronic component 10 by etching.

FIG. 6A, FIG. 6B, FIG. 6C, FIG. 6D, FIG. 6E and FIG. 6F illustrate various stages of a method for manufacturing an optical device 2 as shown in FIG. 2A in accordance with some embodiments of the present disclosure. Although some processes, operations or steps are described in the following with respect to each of a plurality of components, any of those processes, operations or steps may be selectively performed with respect to one of the plurality of components, or with respect to some number in between one and the full plurality of components.

Figure 6A:
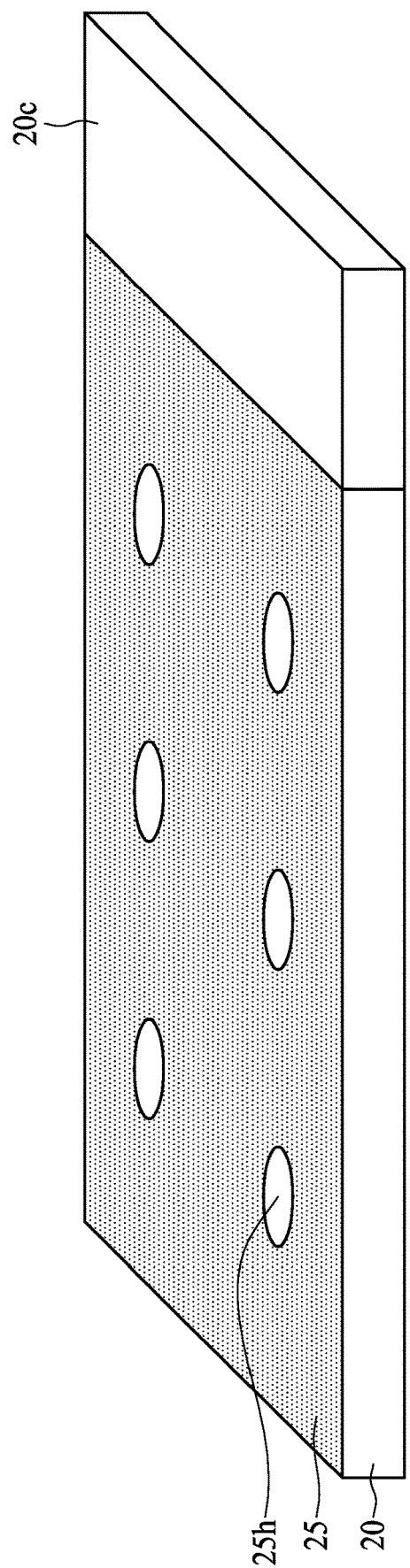
FIG. 6A illustrates one or more stages of a method for manufacturing an optical device in accordance with some embodiments of the present disclosure.

Referring to FIG. 6A, an electronic component 20 is provided. The electronic component 20 may include a bonding area 20c. The light shielding layer 25 is formed on the active surface 201 of the electronic component 20. The light shielding layer 25 defines a plurality of openings 25h (also referred to as apertures) to expose pixels of the electronic component 20.

Figure 6B:
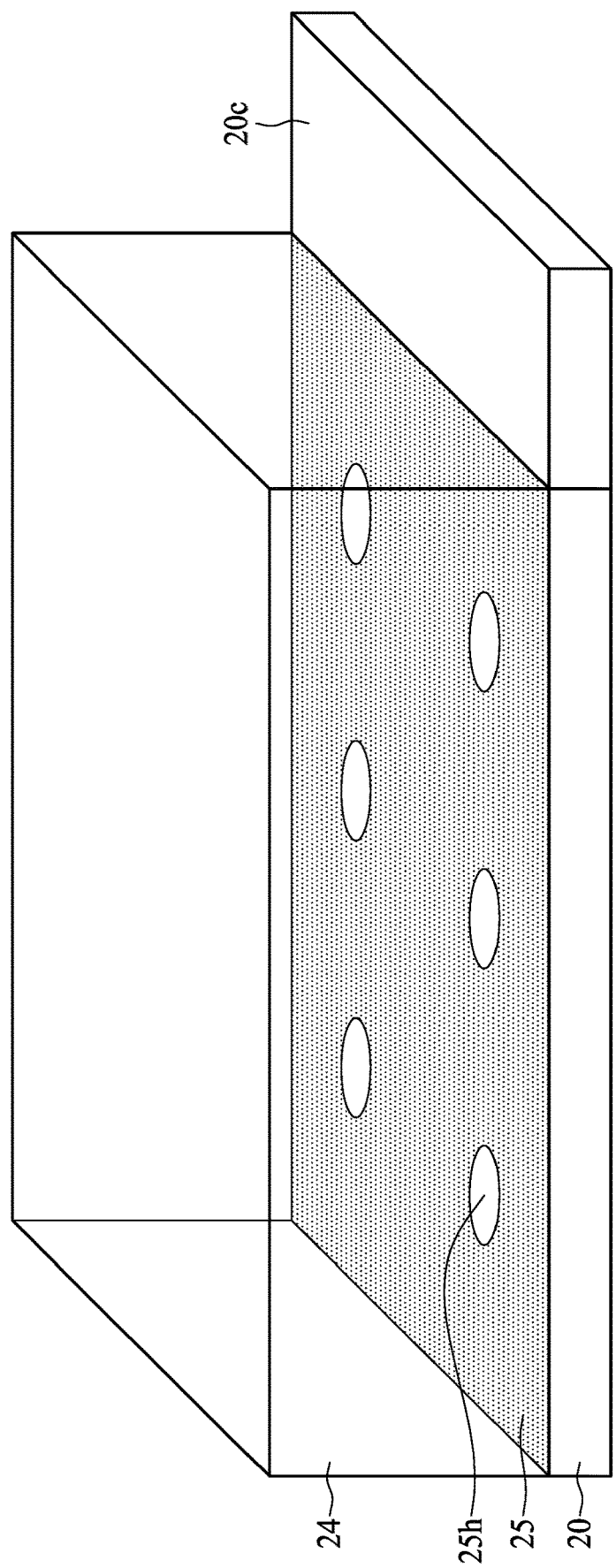
FIG. 6B illustrates one or more stages of a method for manufacturing an optical device in accordance with some embodiments of the present disclosure.

Referring to FIG. 6B, a light transmission layer 24 is formed on an active surface 201 of the electronic component 20 to cover the light shielding layer 25 and to expose the bonding area 20c. In some embodiments, a thickness of the light transmission layer 24 is in a range from about 80 μm to about 100 μm, from about 50 μm to about 150 μm, or from about 20 μm to about 200 μm. In some embodiments, the light transmission layer 24 is formed by, for example, sputtering, coating or other suitable processes.

Figure 6C:
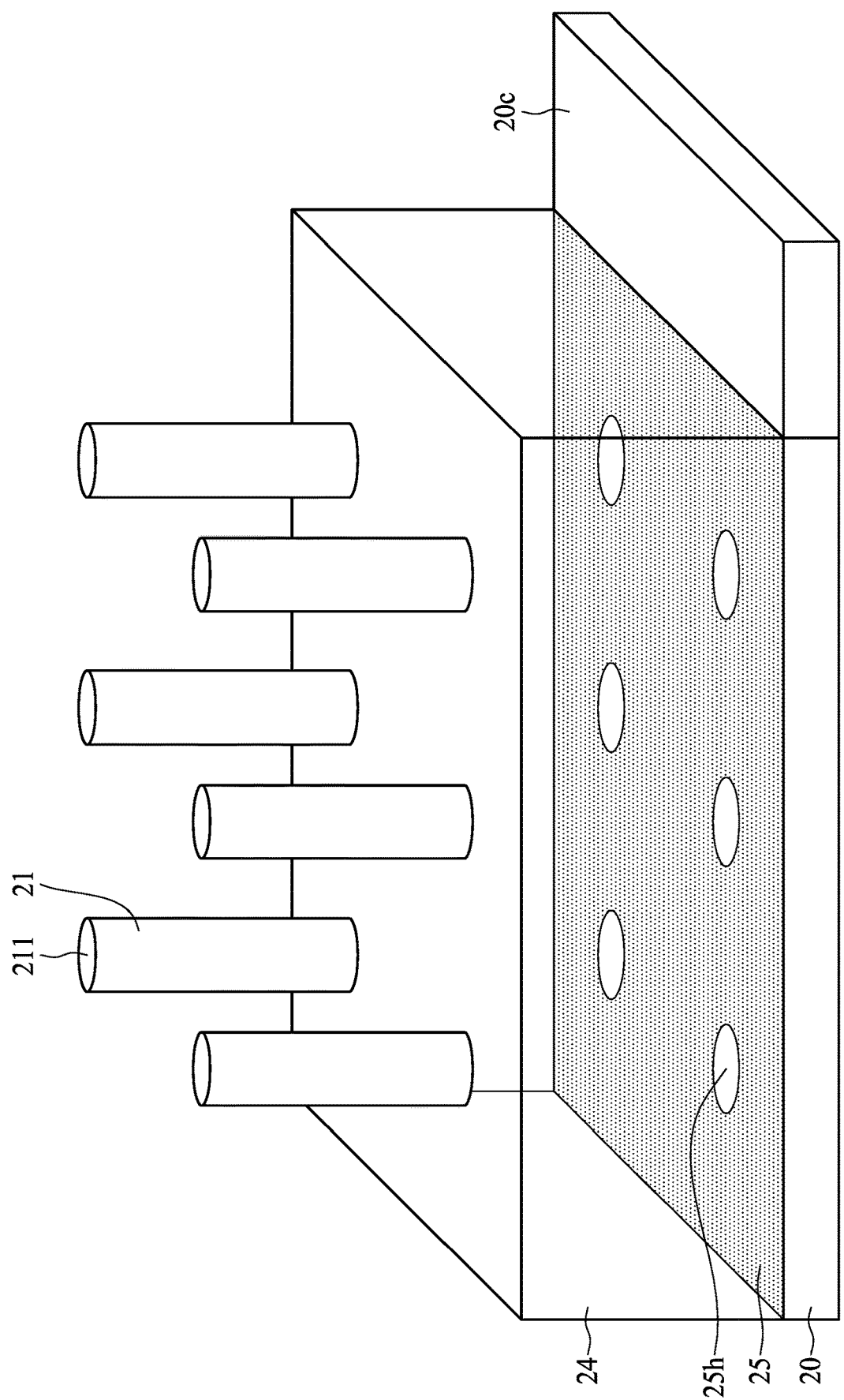
FIG. 6C illustrates one or more stages of a method for manufacturing an optical device in accordance with some embodiments of the present disclosure.

Referring to FIG. 6C, light conducting pillars 21 are formed on light transmission layer 24. Each of the light conducting pillars 21 is substantially aligned with a corresponding pixel of the electronic component 20 that is exposed from the light shielding layer 25. In some embodiments, the light conducting pillars 21 are formed by lithographic technique. In some embodiments, a height of the light conducting pillars 21 is in a range from about 55 μm to about 70 μm, from about 30 μm to about 80 μm, or from about 10 μm to about 100 μm.

Figure 6D:
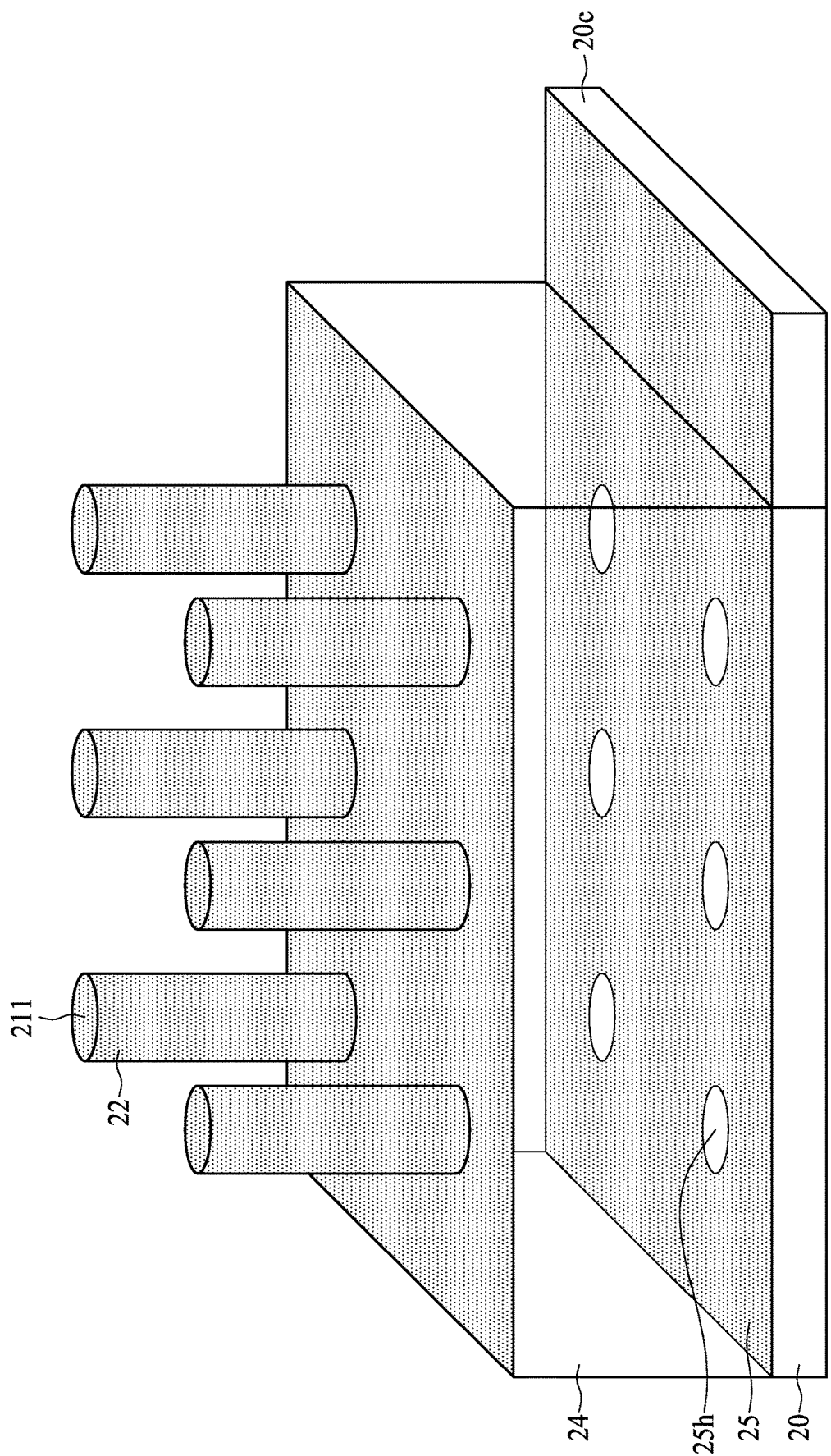
FIG. 6D illustrates one or more stages of a method for manufacturing an optical device in accordance with some embodiments of the present disclosure.

Referring to FIG. 6D, an opaque layer 22 is formed to cover the light conducting pillars 21, the light transmission layer 24 and the bonding area 20c of the electronic component 20. In some embodiments, the opaque layer 22 can be formed by, surface coating, CVD or other suitable processes.

Figure 6E:
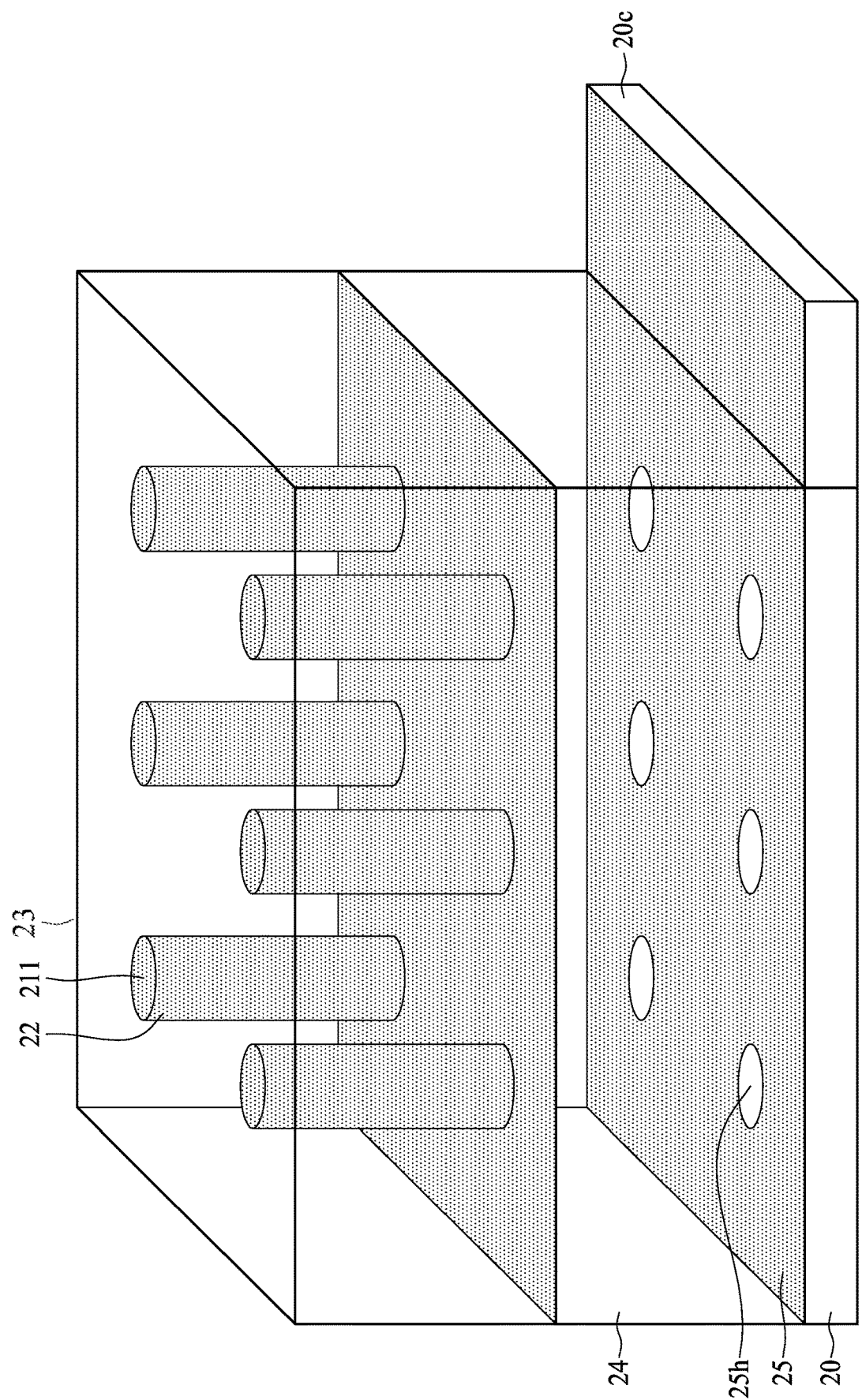
FIG. 6E illustrates one or more stages of a method for manufacturing an optical device in accordance with some embodiments of the present disclosure.

Referring to FIG. 6E, a protective layer 13 is formed on the light transmission layer 24. The protective layer 23 covers the light conducting pillars 21 and exposes the top surface 211 of the light conductive pillars 21 and the bonding area 20c of the electronic component 20. In some embodiments, the protective layer 23 can be formed by a molding technique, such as transfer molding or compression molding.

Figure 6F:
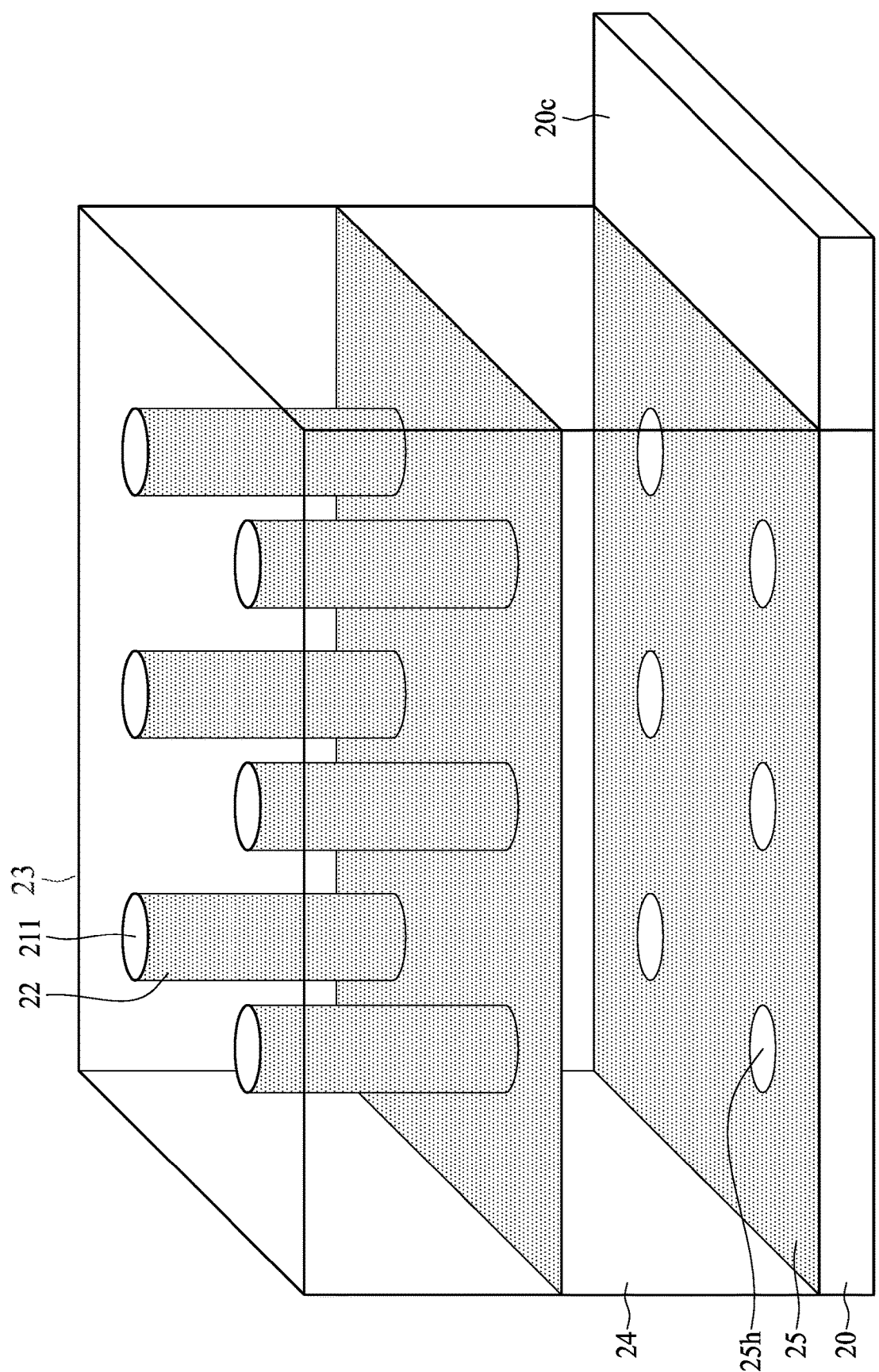
FIG. 6F illustrates one or more stages of a method for manufacturing an optical device in accordance with some embodiments of the present disclosure.

Referring to FIG. 6F, a portion of the protective layer 23 is removed to expose the top surface 211 of the light conducting pillars 21 and a portion of the light shielding layer 25 is removed to expose the bonding area 20c of the electronic component 20. In some embodiments, the portion of the protective layer 23 can be removed by, for example, lithographic technique. In some embodiments, the portion of the light shielding layer 25 can be removed by, for example, etching or other suitable processes.

FIG. 7A, FIG. 7B, FIG. 7C and FIG. 7D illustrate various stages of a method for manufacturing an optical device 3 as shown in FIG. 3 in accordance with some embodiments of the present disclosure. Although some processes, operations or steps are described in the following with respect to each of a plurality of components, any of those processes, operations or steps may be selectively performed with respect to one of the plurality of components, or with respect to some number in between one and the full plurality of components.

Figure 7A:
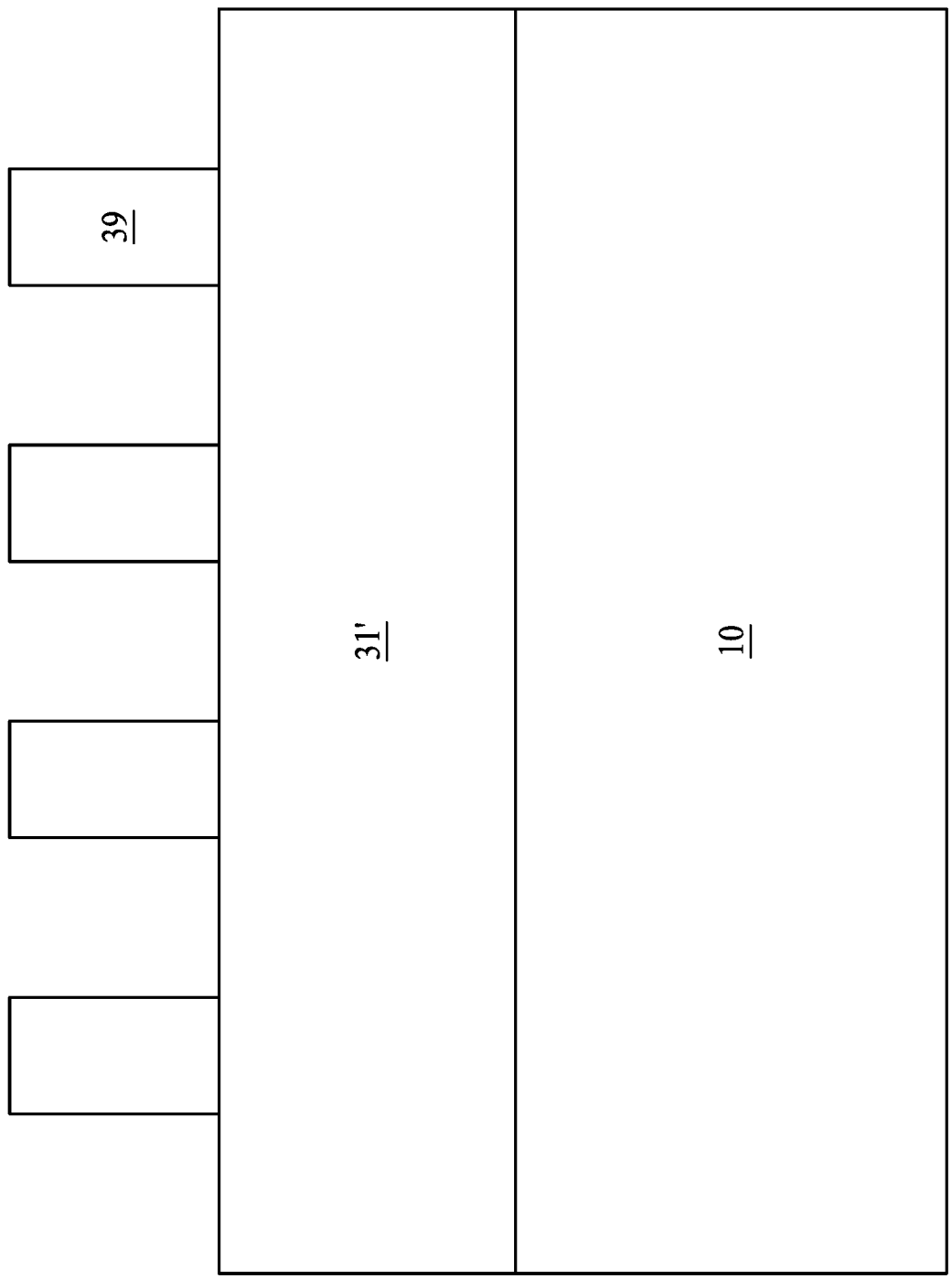
FIG. 7A illustrates one or more stages of a method for manufacturing an optical device in accordance with some embodiments of the present disclosure.

Referring to FIG. 7A, an electronic component 10 with a silicon layer 31' on an active surface of the electronic component 10 is provided. A photoresist 39 is placed on the silicon layer 31'. The photoresist 39 has a predetermined pattern (e.g., as shown in FIG. 7A).

Figure 7B:
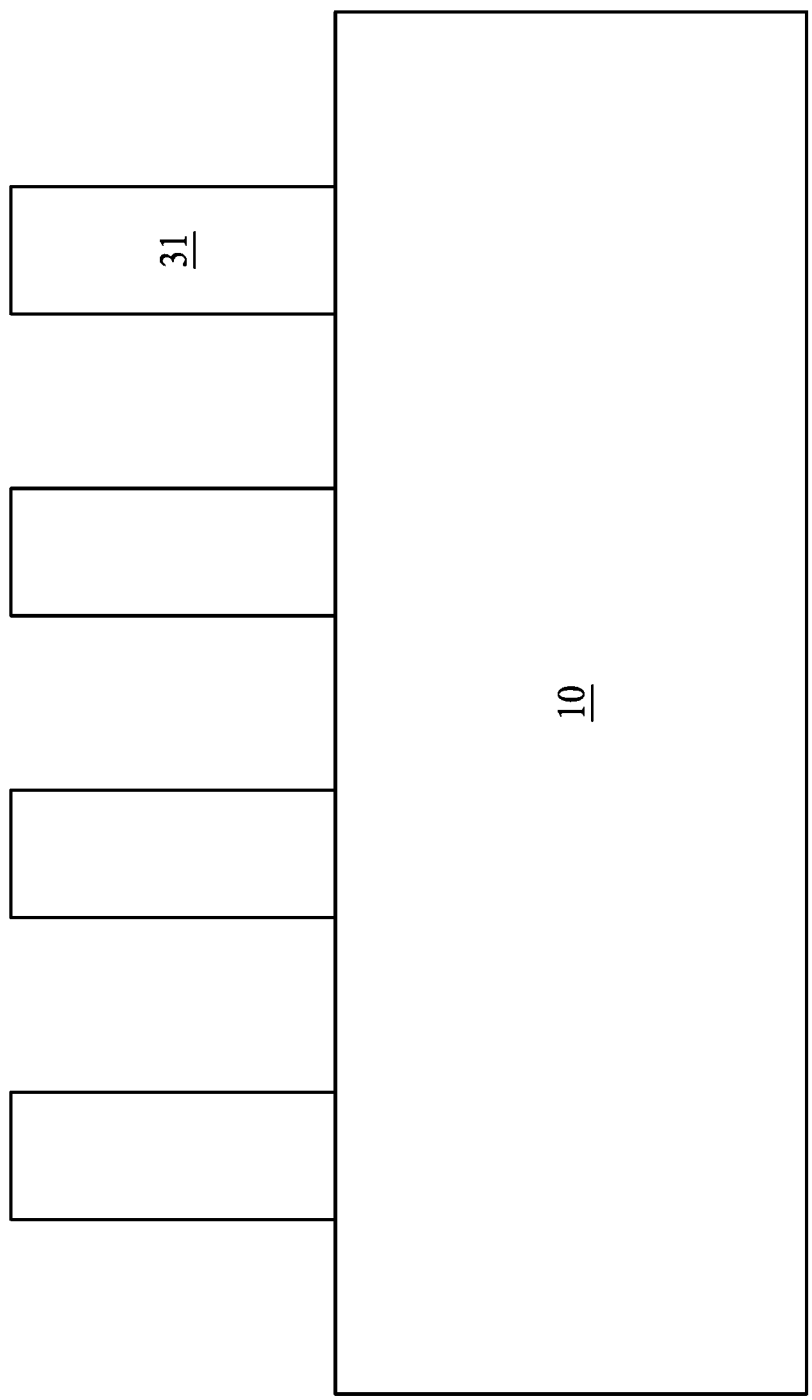
FIG. 7B illustrates one or more stages of a method for manufacturing an optical device in accordance with some embodiments of the present disclosure.

Referring to FIG. 7B, a portion of the silicon layer 31' is removed to form a plurality of light conducting pillars 31. In some embodiments, the portion of the silicon layer 31' is removed by etching or other suitable processes. The photoresist 39 is removed by, e.g., lithographic technique.

Referring to FIG. 7C, a protective layer 33' is formed to cover the light conducting pillars 31 and the active surface of the electronic component 10. In some embodiments, the protective layer 33' can be formed by a molding technique, such as transfer molding or compression molding.

Figure 7D:
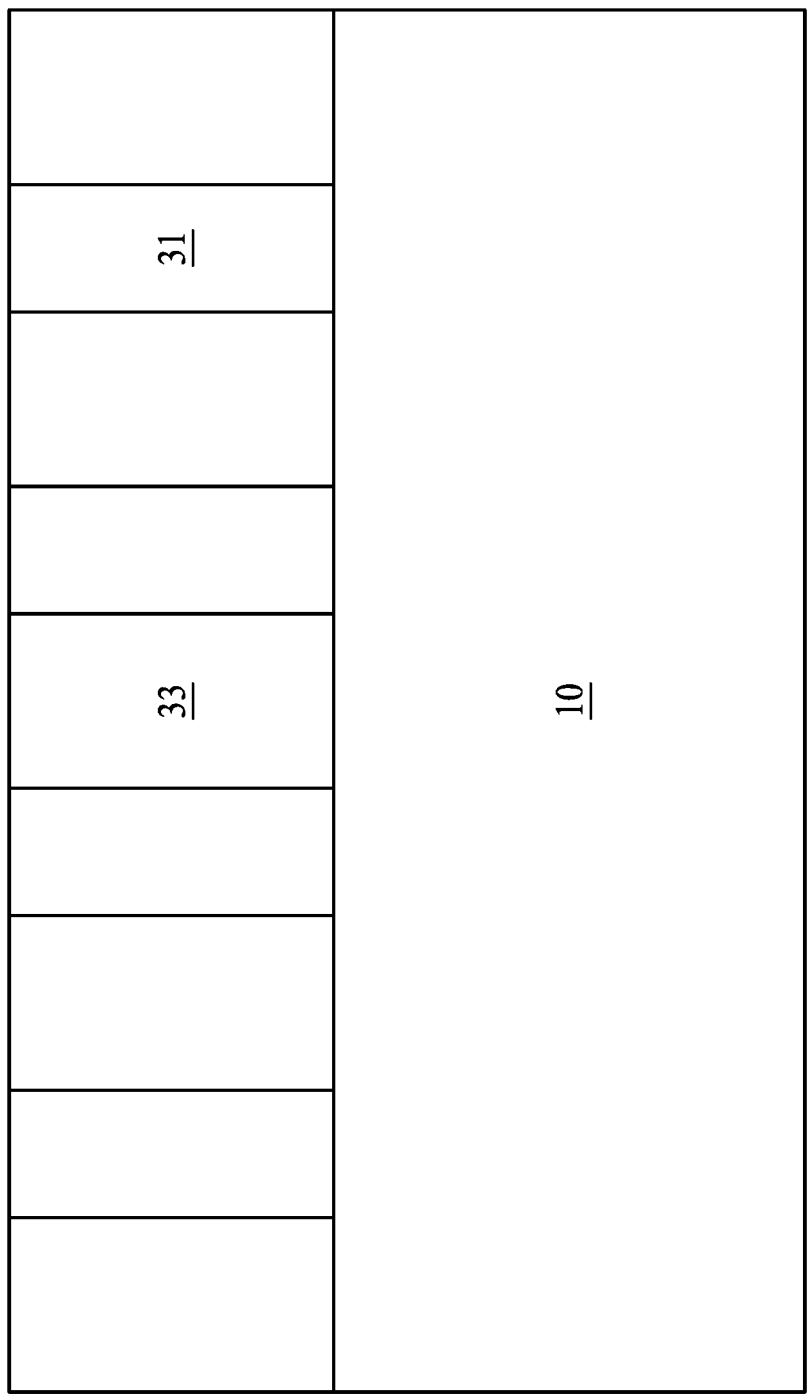
FIG. 7D illustrates one or more stages of a method for manufacturing an optical device in accordance with some embodiments of the present disclosure.

Referring to FIG. 7D, a portion of the protective layer 33' is removed to expose the top surface 311 of the light conducting pillars 31. In some embodiments, the portion of the protective layer 33' can be removed by, for example, lithographic technique.

As used herein, the singular terms "a," "an," and "the" may include a plurality of referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately $10^4$ S/m, such as at least $10^5$ S/m or at least $10^6$ S/m. The electrical conductivity of a material can sometimes vary with temperature. Unless otherwise specified, the electrical conductivity of a material is measured at room temperature.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same or equal if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" parallel can refer to a range of angular variation relative to 0° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°. For example, "substantially" perpendicular can refer to a range of angular variation relative to 90° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°. For example, "substantially" coplanar can refer to two surfaces within 50 μm of lying along a same plane, such as within 40 μm, within 30 μm, within 20 μm, within 10 μm, or within 1 μm of lying along the same plane. For example, "substantially" aligned can refer to two components overlapping or being within 200 μm, within 150 μm, within 100 μm, within 50 μm, within 40 μm, within 30 μm, within 20 μm, within 10 μm, or within 1 μm of overlapping.

In the description of some embodiments, a component provided "on" another component can encompass cases where the former component is directly on (e.g., in physical contact with) the latter component, as well as cases where one or more intervening components are located between the former component and the latter component.

In the description of some embodiments, a component characterized as "light conducting," "light transmitting" or "transparent" can refer to such a component as having a light transmittance of at least 80%, such as at least 85% or at least 90%, over a relevant wavelength or a relevant range of wavelengths. In the description of some embodiments, a component characterized as "light shielding," "light blocking," or "opaque" can refer to such a component as having a light transmittance of no greater than 20%, such as no greater than 15% or no greater than 10%, over a relevant wavelength or a relevant range of wavelengths.

Additionally, amounts, ratios, and other numerical values are sometimes presented herein in a range format. It can be understood that such range formats are used for convenience and brevity, and should be understood flexibly to include not only numerical values explicitly specified as limits of a range, but also all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It can be clearly understood by those skilled in the art that various changes may be made, and equivalent elements may be substituted within the embodiments without departing from the true spirit and scope of the present disclosure as defined by the appended claims. The illustrations may not necessarily be drawn to scale. There may be distinctions between the artistic renditions in the present disclosure and the actual apparatus, due to variables in manufacturing processes and such. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it can be understood that these operations may be combined, sub-divided, or re-ordered to form an equivalent method without departing from the teachings of the present disclosure. Therefore, unless specifically indicated herein, the order and grouping of the operations are not limitations of the present disclosure.

What is claimed is:

1. An optical device, comprising:
    an electronic component including a plurality of pixels;
    a plurality of light conducting pillars, each of the light conducting pillars disposed over a corresponding pixel of the plurality of pixels of the electronic component;
    a light absorbing layer covering a respective lateral surface of each of the plurality of light conducting pillars;
    a light transmission layer between the electronic component and the plurality of light conducting pillars; and a protective layer on the electronic component and covering the light absorbing layer;

wherein each of the plurality of light conducting pillars respectively has a top surface substantially coplanar with a top surface of the protective layer.

2. The optical device of claim 1, wherein a top surface of each of the light conducting pillars is exposed from the protective layer.

3. The optical device of claim 1, wherein the light absorbing layer covers a top surface of the electronic component.

4. The optical device of claim 1, wherein the light conducting pillar includes a photosensitive transparent resin.

5. The optical device of claim 1, further comprising a light shielding layer between the electronic component and the light transmission layer.

6. The optical device of claim 5, wherein the light shielding layer defines a plurality of apertures to expose the corresponding pixels of the electronic component.

7. The optical device of claim 1, wherein an aspect ratio of the light conducting pillars is less than 5:1.

8. The optical device of claim 1, wherein the light conducting pillars include silicon.

9. The optical device of claim 1, wherein the light absorbing layer includes a molding compound.

10. The optical device of claim 1, further comprising a substrate, wherein the electronic component is electrically connected to the substrate.

11. The optical device of claim 1, wherein an aspect ratio of the light conducting pillars is greater than 5:1.

12. A method of manufacturing an optical device, the method comprising:
 (a) providing an electronic component including a plurality of pixels;
 (b) forming a light shielding layer on the electronic component, the light shielding layer defining a plurality of openings to expose the corresponding pixels of the electronic component;
 (c) forming a light transmission layer on the light shielding layer;
 (d) forming a plurality of light conducting pillars over the corresponding pixels of the electronic component; and
 (e) forming a light absorbing layer to cover a lateral surface of each of the light conducting pillars.

13. The method of claim 12, wherein the light conducting pillars are formed of a photosensitive transparent resin by a lithographic technique.

14. The method of claim 12, wherein the operation (e) further comprises coating the light absorbing layer on the lateral surface of each of the light conducting pillars.

15. The method of claim 12, further comprising forming a protective layer on the electronic component to cover the light conducting pillars.

16. The method of claim 15, further comprising removing a portion of the protective layer to expose a top surface of each of the light conducting pillars.

17. The method of claim 15, wherein the protective layer is formed by molding.

18. The method of claim 12, wherein the operation (d) further comprises:
 forming a silicon layer on the electronic component;
 disposing a patterned photoresist on the silicon layer; and
 etching the silicon layer to form the light conducting pillars.

19. An optical device, comprising:
 an electronic component including a plurality of pixels;
 a plurality of light conducting pillars, each of the light conducting pillars disposed over a corresponding pixel of the plurality of pixels of the electronic component;
 a light transmission layer between the electronic component and the plurality of light conducting pillars;
 a light absorbing layer covering a respective lateral surface of each of the light conducting pillars; and
 a protective layer on the electronic component and covering the light absorbing layer;
 wherein the respective lateral surface of each of the light conducting pillars is substantially perpendicular to the electronic component, and
 each of the plurality of light conducting pillars respectively has a top surface substantially coplanar with a top surface of the protective layer.

20. The optical device of claim 19, wherein the light conducting pillar includes a photosensitive transparent resin.

* * * * *